US008621397B2

(12) United States Patent
Chae

(10) Patent No.: US 8,621,397 B2
(45) Date of Patent: Dec. 31, 2013

(54) MOBILE TERMINAL AND METHOD OF CONTROLLING COMMUNICATION DATA TRANSMISSION AND COMMUNICATION LIST DISPLAY THEREIN

(75) Inventor: Byung Kee Chae, Daegu (KR)

(73) Assignee: LG Electronics Inc., Seoul (KR)

( * ) Notice: Subject to any disclaimer, the term of this patent is extended or adjusted under 35 U.S.C. 154(b) by 400 days.

(21) Appl. No.: 12/883,298

(22) Filed: Sep. 16, 2010

(65) Prior Publication Data
US 2011/0314374 A1  Dec. 22, 2011

(30) Foreign Application Priority Data

Jun. 22, 2010  (KR) .................. 10-2010-0058985

(51) Int. Cl.
*G06F 3/033*  (2013.01)
*G06F 3/01*  (2006.01)
*H04W 4/00*  (2009.01)
*H04M 1/00*  (2006.01)

(52) U.S. Cl.
USPC ......... 715/863; 715/702; 455/435.2; 455/558

(58) Field of Classification Search
USPC .................. 455/411, 558, 435.2; 715/863
See application file for complete search history.

(56) References Cited

U.S. PATENT DOCUMENTS

| 7,477,233 | B2 * | 1/2009 | Duncan et al. ............... 345/156 |
| 8,019,330 | B2 * | 9/2011 | Phillips et al. ............. 455/422.1 |
| 2006/0183477 | A1 * | 8/2006 | Bocking et al. ............ 455/435.2 |
| 2007/0129103 | A1 * | 6/2007 | Al-Shaikh ..................... 455/551 |
| 2008/0020765 | A1 * | 1/2008 | Black et al. ................ 455/435.2 |
| 2008/0020773 | A1 * | 1/2008 | Black et al. ................... 455/445 |
| 2008/0055236 | A1 * | 3/2008 | Christensen et al. ......... 345/156 |
| 2008/0064443 | A1 * | 3/2008 | Shin et al. ..................... 455/558 |
| 2008/0074399 | A1 | 3/2008 | Lee |
| 2008/0293394 | A1 * | 11/2008 | Silver et al. .................. 455/417 |
| 2008/0300008 | A1 * | 12/2008 | Kim ........................... 455/552.1 |
| 2009/0029736 | A1 * | 1/2009 | Kim et al. ..................... 455/558 |
| 2009/0061932 | A1 * | 3/2009 | Nagarajan .................... 455/558 |
| 2009/0131054 | A1 | 5/2009 | Zhang |
| 2009/0227242 | A1 | 9/2009 | Lee et al. |
| 2009/0305737 | A1 * | 12/2009 | Bae et al. .................. 455/552.1 |

(Continued)

FOREIGN PATENT DOCUMENTS

| CN | 101291474 A | 10/2008 |
| CN | 101583206 A | 11/2009 |

(Continued)

OTHER PUBLICATIONS

Sotovik Ru, "Overview of phones with two sim-cards," Jun. 18, 2006 (available at: http://web.archiveorg/web/20100618062536/http://www.sotovik.ru/catalog/reviews/China_DualSim-rev.html), including translation, 33 pages total.

*Primary Examiner* — Nicholas Ulrich
(74) *Attorney, Agent, or Firm* — Birch, Stewart, Kolasch & Birch, LLP

(57) ABSTRACT

A mobile terminal including at least a first identity module and a second identity module; a wireless communication unit configured to transceive communication data; a touchscreen configured to receive a touch input on a predetermined touch area for selecting one of the first and second identity modules; and a controller configured to control the wireless communication unit to transmit the communication data using the one of the first and second identity modules based on the touch input performed on the predetermined touch area.

14 Claims, 51 Drawing Sheets

(56) References Cited

U.S. PATENT DOCUMENTS

| | | |
|---|---|---|
| 2009/0312020 A1* | 12/2009 | Lee .................... 455/435.2 |
| 2009/0325572 A1 | 12/2009 | Ji |
| 2010/0058211 A1 | 3/2010 | Lee et al. |
| 2010/0060595 A1 | 3/2010 | Lee et al. |
| 2010/0062595 A1 | 3/2010 | Lim et al. |
| 2010/0128900 A1* | 5/2010 | Johnson .................... 381/98 |
| 2010/0167710 A1* | 7/2010 | Alhainen .................... 455/416 |
| 2010/0167781 A1* | 7/2010 | Seo .................... 455/552.1 |
| 2010/0222104 A1* | 9/2010 | Lee .................... 455/558 |
| 2010/0240417 A1* | 9/2010 | Wickman et al. .................... 455/566 |
| 2010/0248782 A1* | 9/2010 | Cheon .................... 455/558 |
| 2011/0028135 A1* | 2/2011 | Srinivasan .................... 455/415 |
| 2011/0105081 A1* | 5/2011 | Park et al. .................... 455/411 |
| 2011/0195749 A1* | 8/2011 | Lan .................... 455/558 |

FOREIGN PATENT DOCUMENTS

| | | |
|---|---|---|
| EP | 2019540 A2 | 1/2009 |
| EP | 2075744 A1 | 7/2009 |
| EP | 2094057 A2 | 8/2009 |
| EP | 2148497 A1 | 1/2010 |
| RU | 2158484 C1 | 10/2000 |
| WO | WO 99/41921 A1 | 8/1999 |
| WO | WO 2006/085107 A1 | 8/2006 |
| WO | WO 2008/143148 A1 | 11/2008 |

\* cited by examiner (a)

| Communication list - SIM 1 | |
|---|---|
| ← ) ① Jane<br>10. 06. 20 AM 10:00 | 1 Call — 1710 |
| → ) ① Jnlia<br>10. 06. 19 AM 7:00 | 1 Call — 1730 |
| | SIM2 \| All — 1753, 1752 |

FIG. 19C

| Message writing | |
|---|---|
| Contents | Hi!<br>How are you? |
| To | Jane |

1 M
1911 1910

MOBILE TERMINAL AND METHOD OF CONTROLLING COMMUNICATION DATA TRANSMISSION AND COMMUNICATION LIST DISPLAY THEREIN

Pursuant to 35 U.S.C. §119(a), this application claims the benefit of earlier filing date and right of priority to Korean Application No. 10-2010-0058985, filed on Jun. 22, 2010, the contents of which are hereby incorporated by reference herein in their entirety.

BACKGROUND OF THE INVENTION

1. Field of the Invention

The present invention relates to a mobile terminal and corresponding method for controlling particular identity modules of the mobile terminal to be used based on a predetermined touching action.

2. Discussion of the Related Art

Generally, terminals can be classified into mobile/portable terminals and stationary terminals. Mobile terminals can also be classified into handheld terminals and vehicle mounted terminals. Mobile terminals also now include a variety of different functions such as photographing of photos or moving pictures, playing music or moving picture files, playing games, receiving broadcasts, etc. and thus operate as multimedia players. However, the mobile terminal is still limited in the amount of services available.

SUMMARY OF THE INVENTION

Accordingly, one object of the present invention is directed to a mobile terminal and corresponding method that substantially obviate one or more problems due to limitations and disadvantages of the related art.

Another object of the present invention is to provide a mobile terminal and corresponding method for allowing a user to easily select an identity module used in transmitting communication data.

Yet another object of the present invention is to provide a mobile terminal and corresponding method for displaying identity module information concerning received and/or sent messages, calls, etc.

To achieve these objects and other advantages and in accordance with the purpose of the invention, as embodied and broadly described herein, the present invention provides in one aspect a mobile terminal including at least a first identity module and a second identity module; a wireless communication unit configured to transceive communication data; a touchscreen configured to receive a touch input on a predetermined touch area for selecting one of the first and second identity modules; and a controller configured to control the wireless communication unit to transmit the communication data using the one of the first and second identity modules based on the touch input performed on the predetermined touch area.

In another aspect, the present invention provides a method of controlling a mobile terminal including at least a first identity module and a second identity module. The method includes allowing, via a wireless communication unit, transceiving of communication data using one of the first and second identity modules; receiving, via a touchscreen, a touch input on a predetermined touch area of the touchscreen for selecting one of the first and second identity modules; and controlling, via a controller, the wireless communication unit to transmit the communication data using said one of the first and second identity modules based on the touch input performed on the predetermined touch area.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIGS. 17A to 17C are diagrams of screen configurations displaying a communication list constructed with counterpart information including identity information of a corresponding identity module according to one embodiment of the present invention;

FIGS. 19A to 19C are diagrams of screen configurations for sending a message to a specific counterpart terminal using an identity module indicated by a touch pattern of a touch action performed on a send key zone included in specific counterpart information according to one embodiment of the present invention.

DETAILED DESCRIPTION OF THE INVENTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

First of all, mobile terminals described in this disclosure can include a mobile phone, a smart phone, a laptop computer, a digital broadcast terminal, a PDA (personal digital assistants), a PMP (portable multimedia player), a navigation system and the like. The configurations according to an embodiment described in this disclosure may also be applied to a stationary terminal such as a digital TV, a desktop computer and the like.

Figure 1:
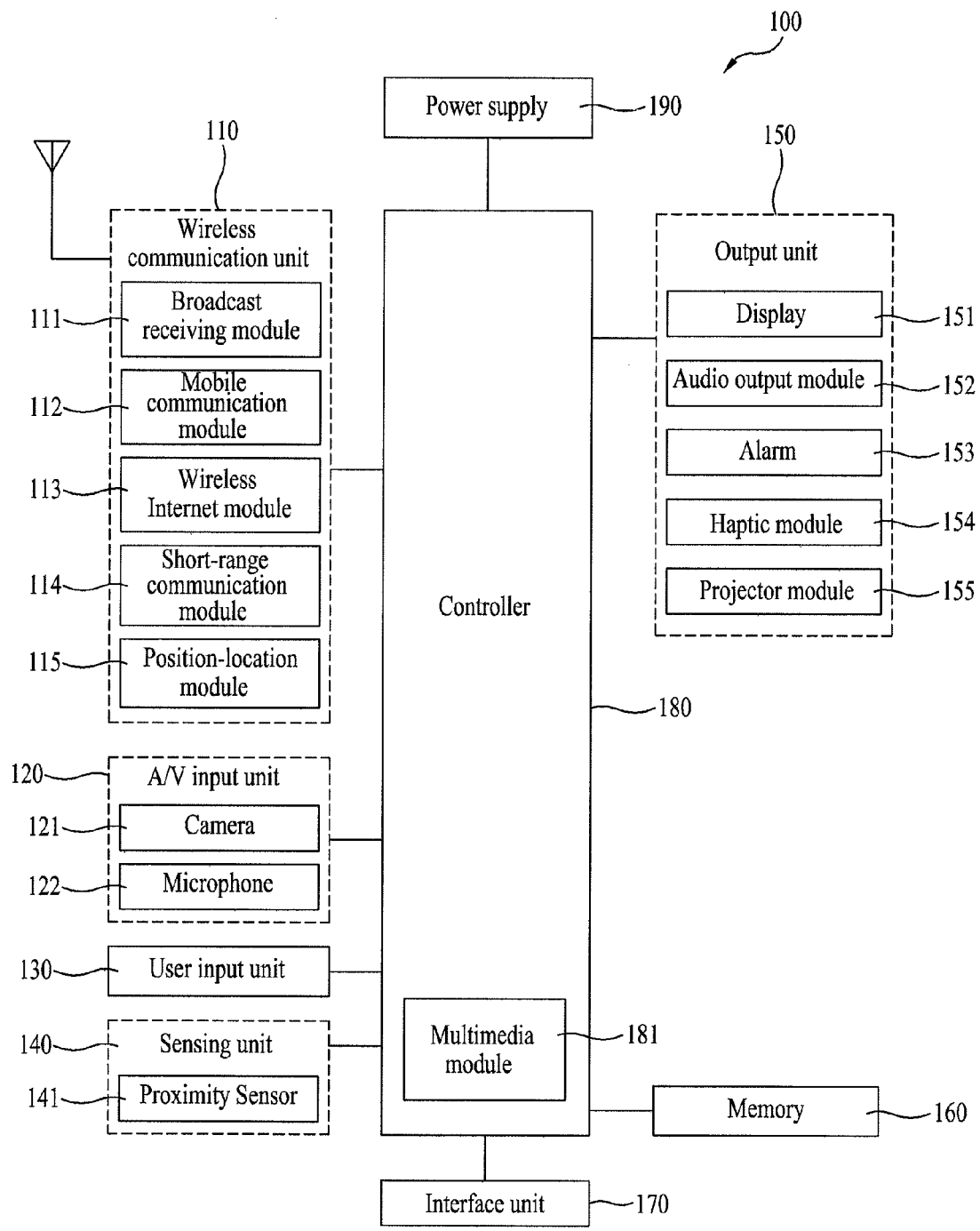
FIG. 1 is a block diagram of a mobile terminal according to one embodiment of the present invention.

FIG. 1 is a block diagram of a mobile terminal 100 according to one embodiment of the present invention. Referring to FIG. 1, the mobile terminal 100 includes a wireless communication unit 110, an A/V (audio/video) input unit 120, a user input unit 130, a sensing unit 140, an output unit 150, a memory 160, an interface unit 170, a controller 180, a power supply 190 and the like. FIG. 1 shows the mobile terminal 100 having various components, but it is understood that implementing all of the illustrated components is not a requirement. Greater or fewer components may alternatively be implemented.

The wireless communication unit 110 includes one or more components which permits wireless communication between the mobile terminal 100 and a wireless communication system or network within which the mobile terminal 100 is located. For instance, and as shown in FIG. 1, the wireless communication unit 110 can include a broadcast receiving module 111, a mobile communication module 112, a wireless Internet module 113, a short-range communication module 114, a position-location module 115 and the like.

The broadcast receiving module 111 receives a broadcast signal and/or broadcast associated information from an external broadcast managing server via a broadcast channel. The broadcast channel may include a satellite channel and a terrestrial channel. Further, the broadcast managing server generally refers to a server which generates and transmits a broadcast signal and/or broadcast associated information or a server which is provided with a previously generated broadcast signal and/or broadcast associated information and then transmits the provided signal or information to a terminal. The broadcast signal may also be implemented as a TV broadcast signal, a radio broadcast signal, and a data broadcast signal, among others. The broadcast signal may further include a broadcast signal combined with a TV or radio broadcast signal.

The broadcast associated information includes information associated with a broadcast channel, a broadcast program, a broadcast service provider, etc. In addition, the broadcast associated information can be provided via a mobile communication network, and in this instance, the broadcast associated information can be received by the mobile communication module 112.

Further, the broadcast associated information can be implemented in various forms. For instance, broadcast associated information may include an electronic program guide (EPG) of the digital multimedia broadcasting (DMB) system and electronic service guide (ESG) of the digital video broadcast-handheld (DVB-H) system.

The broadcast receiving module 111 may also be configured to receive broadcast signals transmitted from various types of broadcast systems. In a non-limiting example, such broadcasting systems include the digital multimedia broadcasting-terrestrial (DMB-T) system, the digital multimedia broadcasting-satellite (DMB-S) system, the digital video broadcast-handheld (DVB-H) system, the data broadcasting system known as media forward link only (MediaFLO®) and the integrated services digital broadcast-terrestrial (ISDB-T) system. The broadcast receiving module 111 can also be configured suitable for other broadcasting systems as well as the above-explained digital broadcasting systems. Further, the broadcast signal and/or broadcast associated information received by the broadcast receiving module 111 may be stored in a suitable device, such as the memory 160.

In addition, the mobile communication module 112 transmits/receives wireless signals to/from one or more network entities (e.g., base station, external terminal, server, etc.). Such wireless signals may represent audio, video, and data according to text/multimedia message transmission/receptions, among others. Further, the wireless Internet module 113 supports Internet access for the mobile terminal 100, and may be internally or externally coupled to the mobile terminal 100. In this instance, the wireless Internet technology can include WLAN (Wireless LAN) (Wi-Fi), Wibro (Wireless broadband), Wimax (World Interoperability for Microwave Access), HSDPA (High Speed Downlink Packet Access), etc.

Further, the short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few. In addition, the position-location module 115 identifies or otherwise obtains the location of the mobile terminal 100, and may be implemented with a global positioning system (GPS) module.

Referring to FIG. 1, the audio/video (A/V) input unit 120 is configured to provide audio or video signal input to the mobile terminal 100. As shown, the A/V input unit 120 includes a camera 121 and a microphone 122. The camera 121 receives and processes image frames of still pictures or video, which are obtained by an image sensor in a video call mode or a photographing mode. The processed image frames can then be displayed on the display 151.

Further, the image frames processed by the camera 121 can be stored in the memory 160 or can be externally transmitted via the wireless communication unit 110. Optionally, at least two cameras 121 can be provided to the mobile terminal 100. In addition, the microphone 122 receives an external audio signal while the mobile terminal or portable device is in a particular mode, such as phone call mode, recording mode and voice recognition. The audio signal is processed and converted into electric audio data, and the processed audio data is transformed into a format transmittable to a mobile communication base station via the mobile communication module 112 for a call mode. The microphone 122 also can include assorted noise removing algorithms to remove noise generated in the course of receiving the external audio signal.

In addition, the user input unit 130 generates input data responsive to user manipulation of an associated input device or devices. Examples of such devices include a keypad, a dome switch, a touchpad (e.g., static pressure/capacitance), a jog wheel, a jog switch, etc. Further, the sensing unit 140 provides sensing signals for controlling operations of the mobile terminal 100 using status measurements of various aspects of the mobile terminal 100. For instance, the sensing unit 140 can detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, an orientation or acceleration/deceleration of the mobile terminal 100.

As an example, consider the mobile terminal 100 being configured as a slide-type mobile terminal. In this configuration, the sensing unit 140 can sense whether a sliding portion of the mobile terminal 100 is opened or closed. Other examples include the sensing unit 140 sensing the presence or absence of power provided by the power supply 190, the presence or absence of a coupling or other connection between the interface unit 170 and an external device. In the embodiment shown in FIG. 1, the sensing unit 140 also includes a proximity sensor 141.

Further, the output unit 150 generates outputs relevant to the senses of sight, hearing, touch and the like. In FIG. 1, the output unit 150 includes the display 151, an audio output module 152, an alarm unit 153, a haptic module 154 and the like. In more detail, the display 151 visually displays (outputs) information associated with the mobile terminal 100. For instance, if the mobile terminal is operating in a phone call mode, the display can provide a user interface (UI) or graphical user interface (GUI) which includes information associated with placing, conducting, and terminating a phone call. As another example, if the mobile terminal 100 is in a video call mode or a photographing mode, the display 151 can additionally or alternatively display images which are associated with these modes, the UI or the GUI.

In addition, the display 151 can be implemented using display technologies including, for example, a liquid crystal display (LCD), a thin film transistor-liquid crystal display (TFT-LCD), an organic light-emitting diode display (OLED), a flexible display and a three-dimensional display. The mobile terminal 100 may also include one or more of such displays. Some of the above displays can also be implemented in a transparent or optical transmittive type, which is called a transparent display. A TOLED (transparent OLED) or the like is a representative example for the transparent display. A rear configuration of the display 151 can also be implemented in the optical transmittive type as well. In this configuration, a user can see an object in rear of a terminal body via the area occupied by the display 151 of the terminal body.

At least two displays 151 can also be provided to the mobile terminal 100 in accordance with the implemented configuration of the mobile terminal 100. For instance, a plurality of displays can be arranged on a single face of the mobile terminal 100 in a manner of being spaced apart from each other or being built in one body. Alternatively, a plurality of displays can be arranged on different faces of the mobile terminal 100.

In addition, when the display 151 and a sensor for detecting a touch action (hereinafter called 'touch sensor') configures a mutual layered structure (hereinafter called 'touchscreen'), the display 151 can be used as an input device as well as an output device. In this instance, the touch sensor can be configured as a touch film, a touch sheet, a touchpad or the like. Further, the touch sensor can be configured to convert a pressure applied to a specific portion of the display 151 or a variation of a capacitance generated from a specific portion of the display 151 to an electric input signal. Moreover, the touch sensor can detect a pressure of a touch as well as a touched position or size.

Further, if a touch input is made to the touch sensor, signal(s) corresponding to the touch is transferred to a touch controller. The touch controller then processes the signal(s) and transfers the processed signal(s) to the controller 180. Therefore, the controller 180 can determine or know whether a prescribed portion of the display 151 is touched.

Referring again to FIG. 1, the proximity sensor 141 can be provided to an internal area of the mobile terminal 100 enclosed by the touchscreen or around the touchscreen. The proximity sensor 141 is also a sensor that detects a presence or non-presence of an object approaching a prescribed detecting surface or an object existing around the proximity sensor 141 using an electromagnetic field strength or infrared ray without mechanical contact. Hence, the proximity sensor 141 has a durability longer than that of a contact type sensor and also has a utility wider than that of the contact type sensor.

Further, the proximity sensor 141 can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. When the touchscreen includes the electrostatic capacity proximity sensor, the sensor can detect the proximity of a pointer using a variation of electric field according to the proximity of the pointer. In this instance, the touchscreen (touch sensor) can be classified as the proximity sensor.

In the following description, for clarity, an action that a pointer approaches without contacting with the touchscreen to be recognized as located on the touchscreen is named a 'proximity touch'. Also, an action that a pointer actually touches the touchscreen is named 'contact touch'. The meaning of the position on the touchscreen proximity-touched by the pointer means the position of the pointer which vertically opposes the touchscreen when the pointer performs the proximity touch.

The proximity sensor 141 also detects a proximity touch and a proximity touch pattern (e.g., a proximity touch distance, a proximity touch duration, a proximity touch position, a proximity touch shift state, etc.). Information corresponding to the detected proximity touch action and the detected proximity touch pattern can also be output to the touchscreen.

In addition, the audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

Further, the alarm unit 153 can output a signal for announcing the occurrence of a particular event associated with the mobile terminal 100. Typical events include a call received event, a message received event and a touch input received event. The alarm unit 153 can also output a signal for announcing the event occurrence using vibration as well as video or audio signal. The video or audio signal can also be output via the display 151 or the audio output unit 152. Hence, the display 151 or the audio output module 152 can be regarded as a part of the alarm unit 153.

In addition, the haptic module 154 generates various tactile effects that can be sensed by a user. Vibration is a representative one of the tactile effects generated by the haptic module 154. A strength and pattern of the vibration generated by the haptic module 154 can also be controlled. For instance, different vibrations can be output in a manner of being synthesized together or can be output in sequence.

The haptic module 154 can also generate various tactile effects as well as vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can also be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

Further, the memory 160 can store various types of data to support the processing, control, and storage requirements of the mobile terminal 100. Examples of such data include program instructions for applications operating on the mobile terminal 100, contact data, phonebook data, messages, audio, still pictures, moving pictures, etc. In addition, a recent use history or a cumulative use frequency of each data (e.g., use frequency for each phonebook, each message or each multimedia) can be stored in the memory 160. Moreover, data for various patterns of vibration and/or sound output for a touch input to the touchscreen can be stored in the memory 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. And, the mobile terminal 100 is able to operate in association with a web storage for performing a storage function of the memory 160 on Internet.

In addition, the interface unit 170 can be used to couple the mobile terminal 100 with external devices. The interface unit 170 also receives data from the external devices or is supplied with the power and then transfers the data or power to the respective elements of the mobile terminal 100 or enables data within the mobile terminal 100 to be transferred to the external devices. The interface unit 170 may also be configured using a wired/wireless headset port, an external charger port, a wired/wireless data port, a memory card port, a port for coupling to a device having an identity module, audio input/output ports, video input/output ports, an earphone port and/or the like.

In addition, the identity module is a chip for storing various kinds of information for authenticating a use authority of the mobile terminal 100 and can include a User Identify Module (UIM), Subscriber Identify Module (SIM), Universal Subscriber Identity Module (USIM) and/or the like. A device having the identity module (hereinafter called 'identity device') can be manufactured as a smart card. Therefore, the identity device is connectible to the mobile terminal 100 via the corresponding port.

Further, when the mobile terminal 110 is connected to an external cradle, the interface unit 170 becomes a passage for supplying the mobile terminal 100 with a power from the cradle or a passage for delivering various command signals input from the cradle by a user to the mobile terminal 100. Each of the various command signals input from the cradle or the power can operate as a signal enabling the mobile terminal 100 to recognize that it is correctly loaded in the cradle.

In addition, the controller 180 controls the overall operations of the mobile terminal 100. For example, the controller 180 performs the control and processing associated with voice calls, data communications, video calls, etc. In the embodiment in FIG. 1, the controller 180 also includes a multimedia module 181 that provides multimedia playback. The multimedia module 181 may also be configured as part of the controller 180, or implemented as a separate component. Moreover, the controller 180 can perform a pattern recognizing process for recognizing a writing input and a picture drawing input carried out on the touchscreen as characters or images, respectively. In addition, the power supply 190 provides power required by the various components for the mobile terminal 100. The power may be internal power, external power, or combinations thereof.

Various embodiments described herein may also be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

A mobile terminal mentioned in this disclosure can include at least one of the components shown in FIG. 1, and preferably includes a touchscreen configured to receive an input of a touch action from a user. Since the touchscreen is one example of the display 151, the touchscreen will be indicated by the same reference number 151 in the following description.

In addition, communication data mentioned in this disclosure can include an audio call, a video call, a short text message, a long text message, a multimedia message, an email, and the like, for example. Of course, the communication data can include all types of communication data transmittable/receivable to/from a counterpart terminal as well as the examples of the communication data.

According to one embodiment of the present invention, the mobile terminal 100 can include a plurality of identity modules such as a first identity module, a second identity module and the like. Also, each of the first and second identity modules can be detachably provided to the mobile terminal 100.

Configurations of the mobile terminal 100 provided with a plurality of identity modules will now be explained in more detail with reference to FIGS. 2A and 2B. For clarity and convenience of the following description, the plurality of the identity modules is assumed to include a first identity module 210 and a second identity module 220.

Figure 2A:
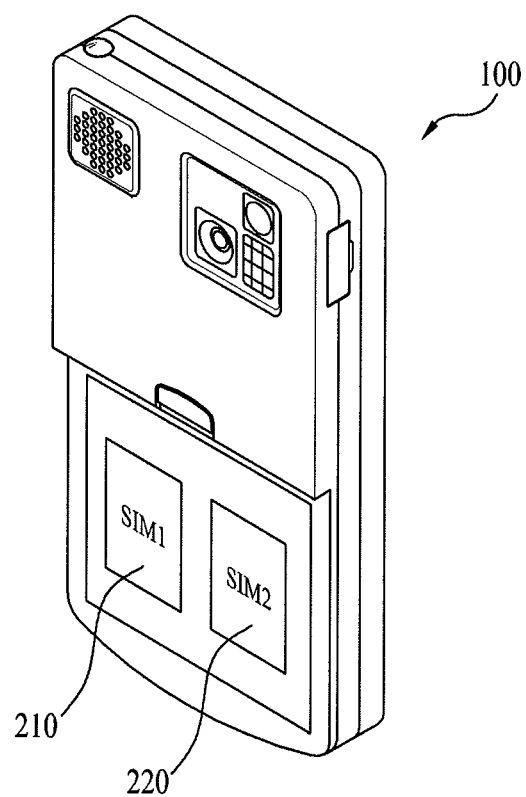
FIGS. 2A and 2B are diagrams illustrating a plurality of identity modules detachably loaded in a mobile terminal according to one embodiment of the present invention.
Figure 2B:
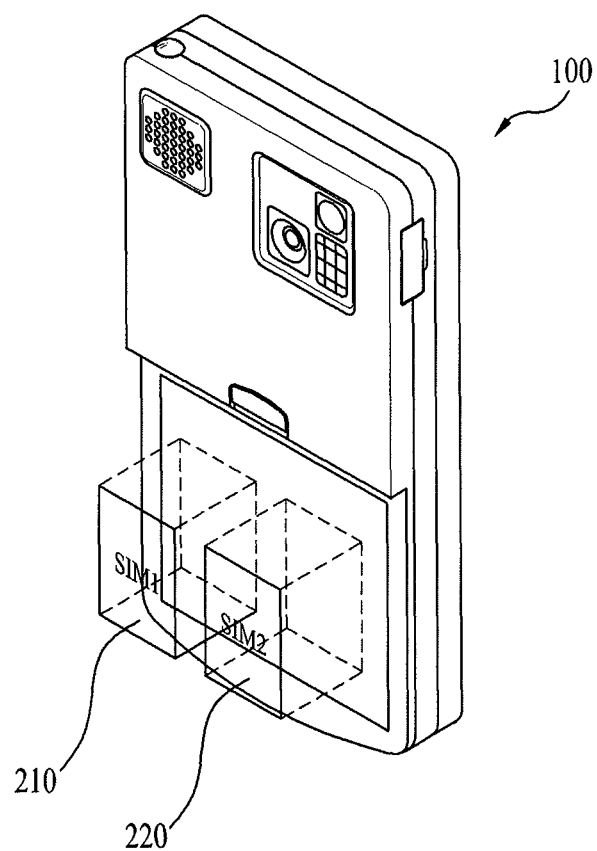

Referring to FIGS. 2A and 2B, the first identity module 210 and the second identity module 220 can be detachably provided to a prescribed portion of the mobile terminal 100, and more particularly, to a backside of the mobile terminal 100. In addition, each of the first and second identity modules 210 and 220 has user authentication information stored therein and also has an individual phone number set therefor. Thus, because two phone numbers are set for the mobile terminal 100, a user can be substantially provided with an effect of using a pair of terminals.

For instance, one phone number '010-111-1111' can be set for the first identity module 210, while the other phone number '010-123-1234' can be set for the second identity module 220. The mobile terminal 100 can also transceive communication data corresponding to the first identity module 210 and communication data corresponding to the second identity module 220 simultaneously or at different timing points, using the first and second identity modules 210 and 220.

Also, as mentioned in the foregoing description, an identity module can include one of USIM, SIM and the like. In addition, according to an embodiment of the present invention, the mobile terminal 100 displays a send key zone on the touchscreen 151 and can then receive an input of a user touch action performed on the send key zone. The send key zone is a predetermined touch area for selecting one of the first and second identity modules.

In more detail, the send key zone is a key zone/predetermined area configured to receive an input of a transmission command of communication data from a user and is able to receive an input of a transmission command in a manner of discriminating the first identity module 210 and the second identity module 220, which shall be described in more detail later with reference to FIGS. 6A to 10C.

Figure 3A:
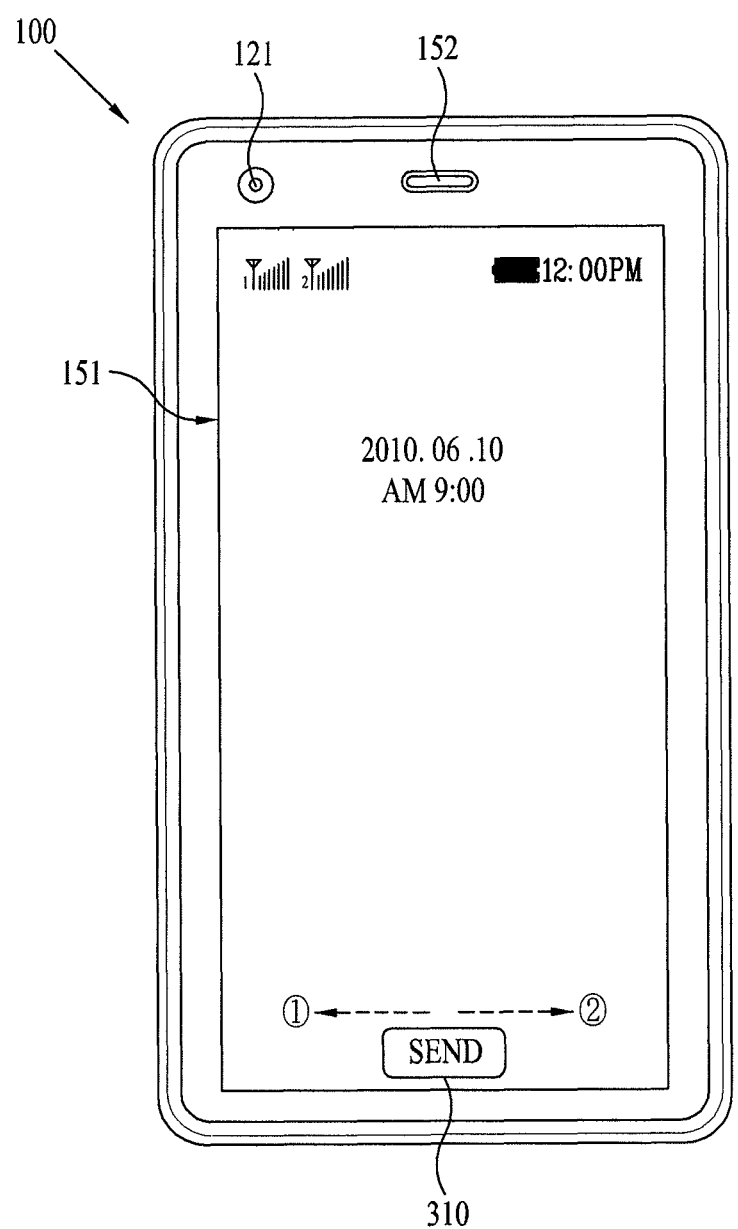
FIGS. 3A and 3B are diagrams of screen configurations displaying a send key zone on a touchscreen of a mobile terminal according to one embodiment of the present invention.
Figure 3B:
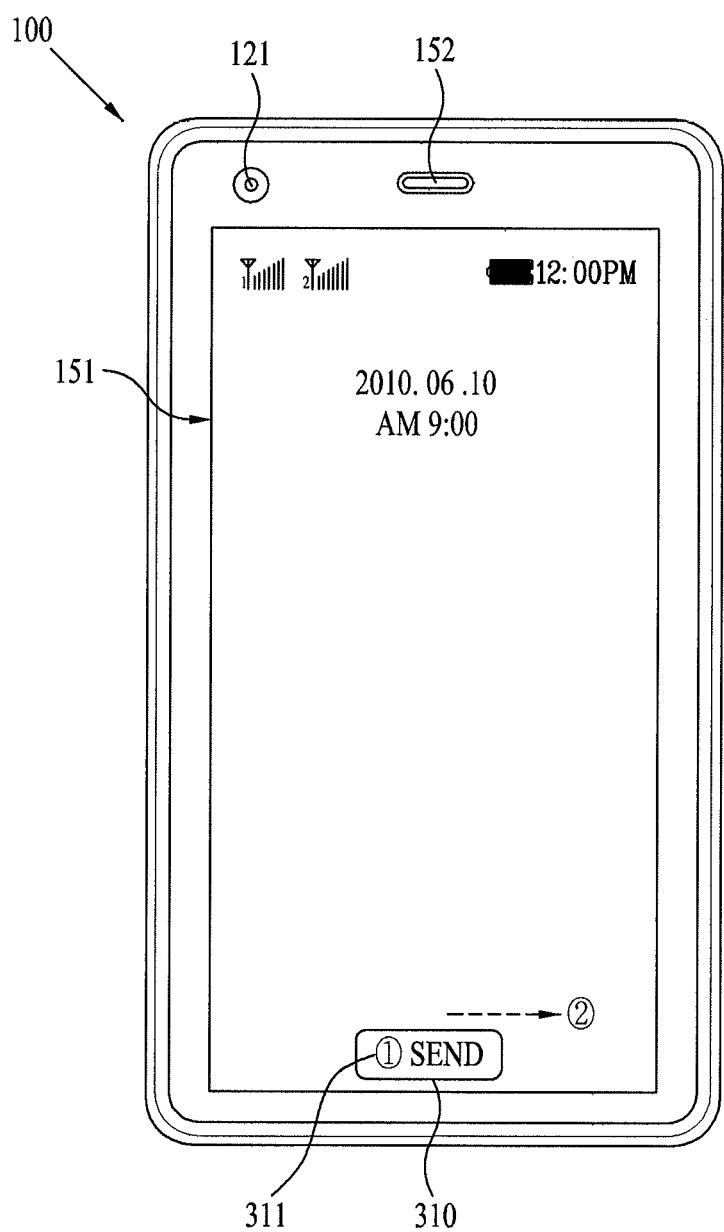

Next, FIGS. 3A and 3B are diagrams of screen configurations for displaying a send key zone/predetermined touch area on a touchscreen of a mobile terminal according to one embodiment of the present invention. Referring to FIG. 3A, a send key zone 310 is provided to a lower end portion of a screen. When receiving an input of a touch & drag action in a direction ①, the send key zone 310 receives a transmission command of communication data using the first identity module 210. Also, when receiving an input of a touch & drag action in a direction ②, the send key zone 310 receives a transmission command of communication data using the second identity module 220.

Referring to FIG. 3B, the send key zone 310 is again provided to a lower end portion of a screen. In this example, when receiving an input of a touch & drag action performed on a prescribed point, the send key zone 310 receives a transmission command of communication data using the first identity module 210. Also, when receiving an input of a touch & drag action in a direction ②, the send key zone 310 receives a transmission command of communication data using the second identity module 220. Specifically, FIG. 3B shows the first identity module 210 is designated as a basic identity module or a priority identity module.

Next, a method of controlling communication data transmission in a mobile terminal according to an embodiment of the present invention will be explained with reference to FIGS. 4 to 15B. In more detail, FIG. 4 is a flowchart illustrating a method of controlling communication data transmission in a mobile terminal according to one embodiment of the present invention.

Figure 4:
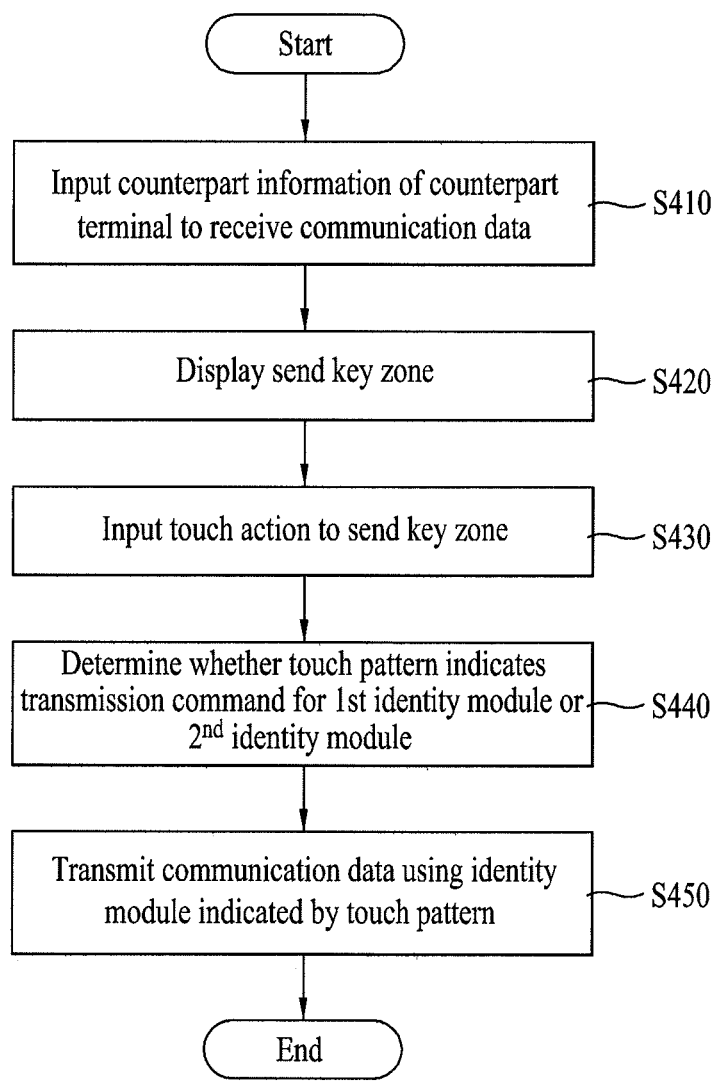
FIG. 4 is a flowchart illustrating a method of controlling communication data transmission in a mobile terminal according to one embodiment of the present invention.

Referring to FIG. 4, the mobile terminal 100 receives input information of a counterpart terminal via the user input unit 130 from a user (S410). That is, the counterpart terminal is at least one other terminal that will communicate with the mobile terminal 100. Also, because the display includes the touchscreen 151, the user can use the touchscreen 151 as one example for the user input unit 130.

For example, the touchscreen 151 can display a virtual keypad that the user can use to input the counterpart information. Of course, the user can input the counterpart information using a physical keypad (e.g., a button type keypad) on the mobile terminal 100. In addition, the user can directly input the counterpart information, or can select specific counterpart information from counterpart information stored in the memory 160. For instance, the counterpart information stored in the memory 160 can be linked to a phonebook related application or counterpart information corresponding to recently-transceived communication data. Specifically, the counterpart information linked to the phonebook related application can include a counterpart title/name, a counterpart phone number and the like.

Next, the controller 180 displays a send key zone on a prescribed portion of a screen displayed on the touchscreen 151 (S420). The send key zone is a predetermined touch area on the touchscreen 151 and can be displayed using a soft-touch button, or by simply designated a particular area of the touchscreen 151. The user can also designate a desired portion of the touchscreen 151 to be used as the send key zone by drawing the predetermined area with their finger, for example, and using the appropriate menu options on the terminal 100.

In addition, the send key zone can always be displayed in a standby picture or a background picture. Alternatively, the send key zone can be displayed only if the counterpart information for a counterpart terminal that is to be communicated with is entirely or partially input. Further, when one of the first and second identity modules 210 and 220 is designated as a priority identity module, the mobile terminal 100 can display identity information indicating which of the identity modules is designated as the priority identity module on the send key zone.

Further, the priority identity module can be the identity module that will preferentially transmit or receive communication data among a plurality of the identity modules provided to the mobile terminal 100. Therefore, communication data can be transmitted using the priority identity module unless the user requests another identity module be used. In addition, the identity information indicates a corresponding identity module and can be represented as a numeral, symbol, icon, image, text or the like.

Next, a method of setting a configuration of an identity module will be explained with reference to FIGS. 5A and 5B. For clarity and convenience of the following description, the identity module is assumed to be a SIM, and include two identity modules SIM 1 and SIM 2.

Figure 5A:
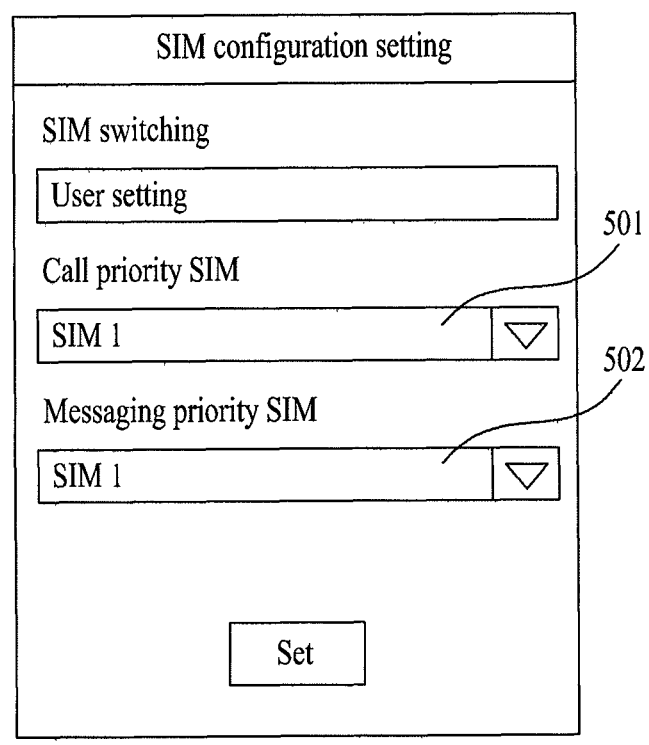
FIGS. 5A and 5B are diagrams of pictures displaying a configuration setting of an identity module according to one embodiment of the present invention.

Referring to FIG. 5A, when the user enters a SIM configuration setting mode, the user can set a particular SIM to perform a particular function. For example, the user can set a call priority SIM and a messaging priority SIM to the SIM 1. Thus, calls and messages will be performed by the SIM 1 as a default unless the user overrides this selection.

Figure 5B:
Figure 5B:

Referring to FIG. 5B, the mobile terminal 100 or user can set identity information for each of the SIM 1 and the SIM 2. For instance, if the user selects an identifier SIM 1 503, the controller 180 displays a user interface for inputting setting identity information for the SIM 1 as shown in FIG. 5B(a). If the user selects an identifier SIM 2 504, the controller 180 displays setting identity information for the SIM 2 as shown in FIG. 5B(b).

In particular, referring to FIG. 5B(a), the identify information for the SIM 1 is set using a color (Blue) and shape (①). Referring to FIG. 5B(b), the identify information for the SIM 2 is set using a color (Red) and shape (②). Referring again to FIG. 4, the user performs a touch action on the send key zone displayed in the displaying step S420 (S430). For example, the touch action can include a touch to a prescribed point, a touch & drag action in a prescribed direction, etc.

Further, the mobile terminal can receive the user's touch action when transmitting an audio or video call, sending a written message, etc. For instance, when transmitting an audio or video call, the user can first input counterpart information of a counterpart terminal that is to receive the audio or video call. Similarly, when sending a written message, the user can input the message and the counterpart information input.

The controller 180 then determines whether the user's touch action on the send key is for selecting the SIM 1 (210) or the SIM 2 (220) (S440). Further, when the input touch action is a touch & drag, the touch pattern can include at least one of a touch & drag direction, a touch & drag distance and a touch & drag speed. For instance, when the touch & drag direction is a left direction, the controller 180 can determine the touch pattern is the transmission command for the first identity module 210. Also, when the touch & drag direction is a right direction, the controller 180 can determine that the touch pattern is the transmission command for the second identity module 220.

Moreover, if the input touch action is a touch to a prescribed point, the touch pattern can include at least one of a touch count, a touch pressure, a touch size, a touch point and a proximity touch distance. For instance, if the touch count is 1, the controller 180 can determine that the touch pattern is the transmission command for the first identity module 210. If the touch count is 2, the controller 180 can determine that the touch pattern is the transmission command for the second identity module 220.

In addition, when the first identity module 210 is designated as the priority identity module (the second identity module 220 can alternatively be designated as the priority identity module), and if the touch pattern is the touch to a prescribed point, the controller 180 can determine that the touch pattern is the transmission command for the first identity module 210. If the touch pattern is the touch & drag in one direction, the controller 180 can determine that the touch pattern is the transmission command for the second identity module 220.

Furthermore, the controller 180 can display either the first identity module 210 or the second identity module 220, which corresponds to the identity module indicated by the touch pattern, on the send key zone. In addition, when the first identity module 210 is designated as the priority identity module, the controller 180 can display the identity information of the first identity module 210 on the send key zone. Also, when receiving an input of the touch action of the touch pattern indicating the second identity module 220, the controller 180 can display the identity information of the second identity module 220 on the send key zone.

Further, the controller 180 transmits the communication data to the counterpart terminal corresponding to the counterpart information input in the inputting step S410 using either the first identity module 210 or the second identity module 220, which is indicated by the touch pattern corresponding to the result of the determination made in the determining step S440 (S450). Also, the transmitting step S450 can be performed by the wireless communication unit 110.

Thus, the mobile terminal can transmit an audio or video call to the counterpart terminal or send a message to the counterpart terminal using the identity module indicated by the touch pattern. Also, when the user releases the touch action from the send key zone or retouches the send key zone after the release of the touch action, the mobile terminal 100 can transmit the communication data to the counterpart terminal using the identity module indicated by the touch pattern. Moreover, a touch pattern of the touch action (hereinafter named a first touch action) input in the inputting step S430 may be different from that of a retouch action (hereinafter named a second touch action). For instance, the first touch action includes a touch & drag, while the second touch action includes a touch to a prescribed point of the send key zone.

Next, FIGS. 6A to 10C are diagrams of screen configurations for transmitting a call using an identity module indicated by a touch pattern of a touch action performed on a send key zone according to an embodiment of the present invention. That is, the communication data is an audio call. For clarity and convenience of the following description, the user has already input the counterpart information (e.g., telephone number) of the counterpart terminal that will receive an audio call. Also, the first and second identity modules 210 and 220 include the SIM 1 and SIM 2, respectively.

Figure 6A:
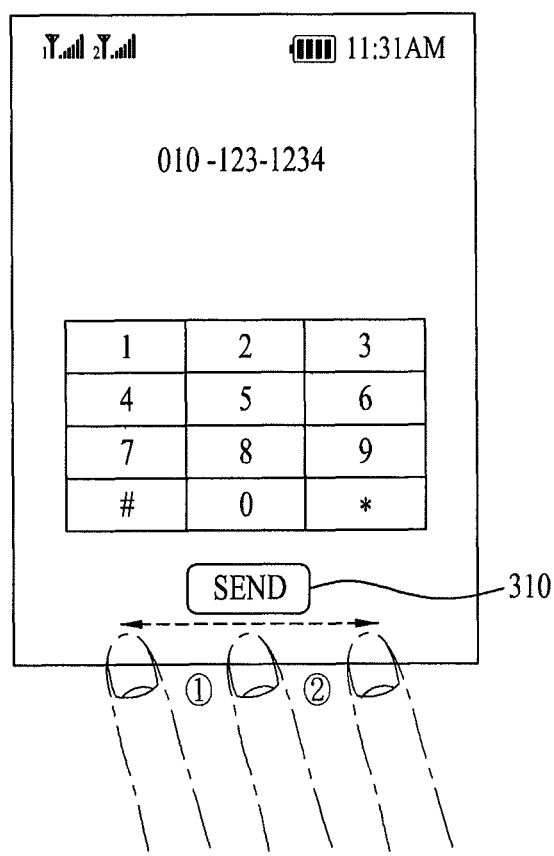
FIGS. 6A to 10C are diagrams of screen configurations for transmitting a call using an identity module indicated by a touch pattern of a touch action performed on a send key zone according to one embodiment of the present invention.
Figure 6B:
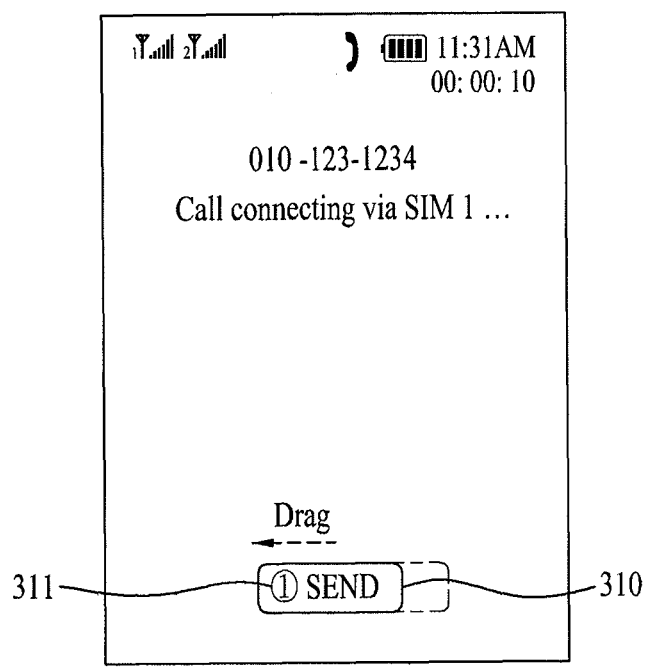
Figure 6C:
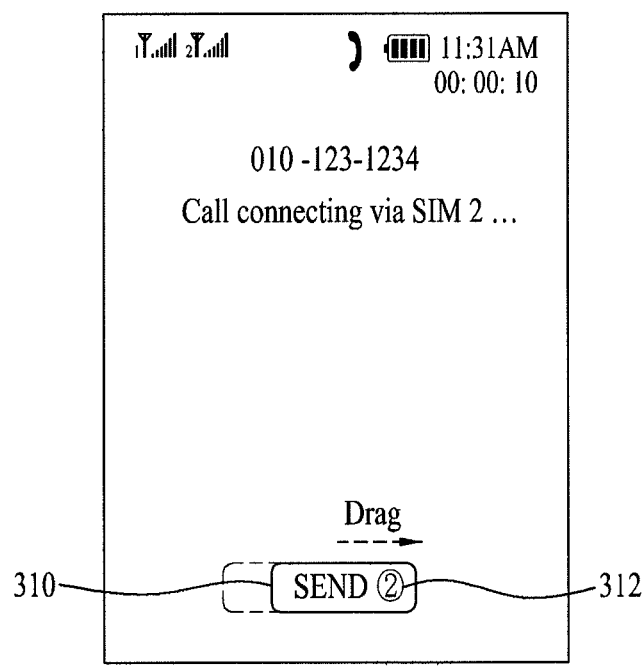

Referring to FIGS. 6A to 6C, the controller 180 can select either the SIM 1 or SIM 2 to use for the audio call transmission according to a direction of a touch & drag performed on a send key zone 310. For instance, when receiving an input of a touch & drag action ① in a left direction of the send key zone 310, the mobile terminal 100 can transmit the audio call using the SIM 1 and display identity information '①' 311 of the SIM 1 on the send key zone 310 as shown in FIG. 6B. Moreover, when receiving an input of a touch & drag action ② in a right direction of the send key zone 310, the mobile terminal 100 can transmit an audio call using the SIM 2 and display identity information '②' 312 of the SIM 2 on the send key zone 310 as shown in FIG. 6C. Further, a drag direction per identity module can be designated by the user or be preset by the mobile terminal 100.

Figure 7A:
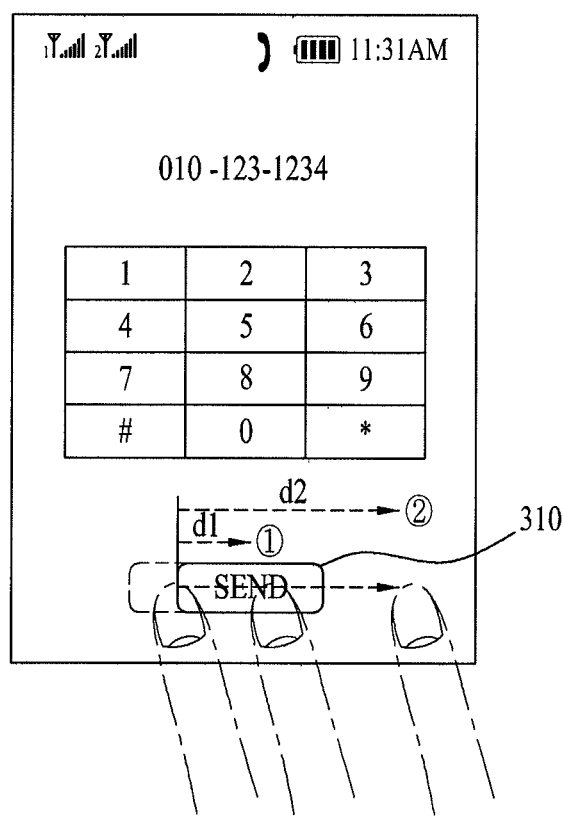
Figure 7B:
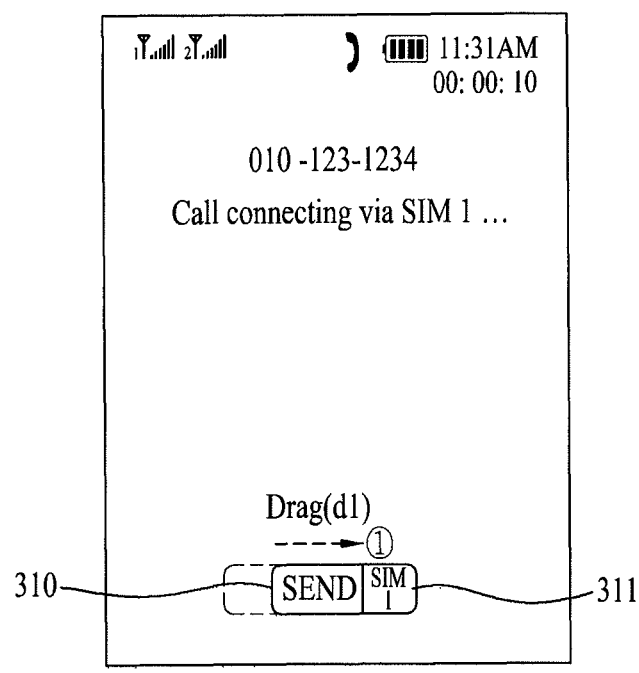
Figure 7C:
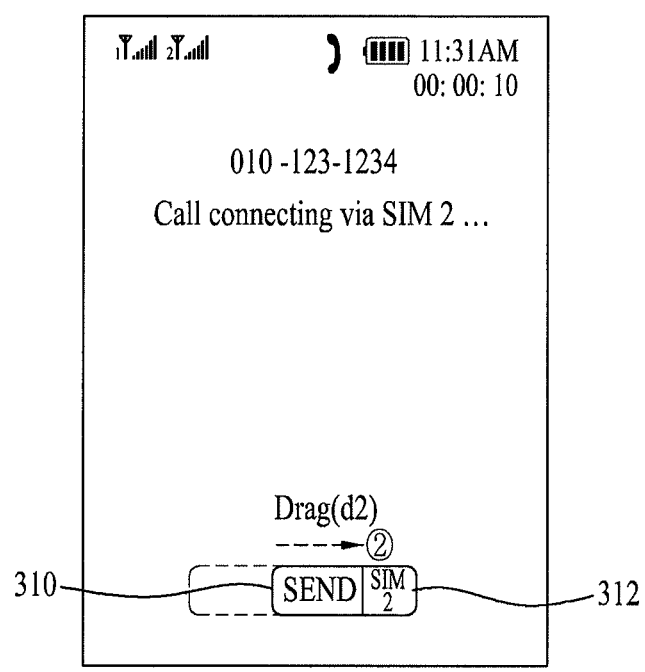

Referring to FIGS. 7A to 7C, the controller 180 can select either the SIM 1 or SIM 2 to use for an audio call transmission according to a distance of a touch & drag performed on the send key zone 310. For instance, when receiving an input of a touch & drag action ① in a first distance d1 in one direction of the send key zone 310, the mobile terminal 100 can transmit an audio call using the SIM 1 and display identity information 'SIM 1' 311 of the SIM 1 on the send key zone 310 as shown in FIG. 7B.

Moreover, when receiving an input of a touch & drag action ② in a second distance d2 in one direction of the send key zone 310, the mobile terminal 100 can transmit an audio call using the SIM 2 and display identity information 'SIM 2' 312 of the SIM 2 on the send key zone 310 as shown in FIG. 7C. Further, a drag distance per identity module can be designated by the user or be preset by the mobile terminal 100.

Figure 8A:
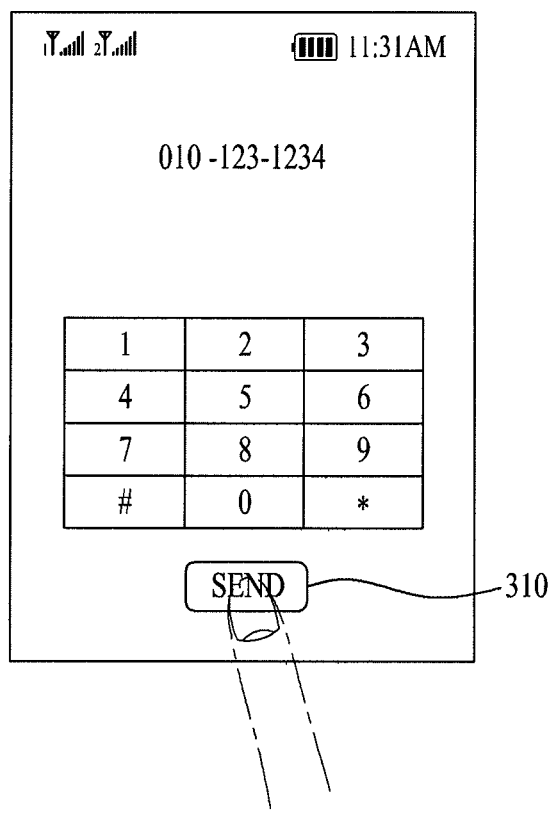
Figure 8B:
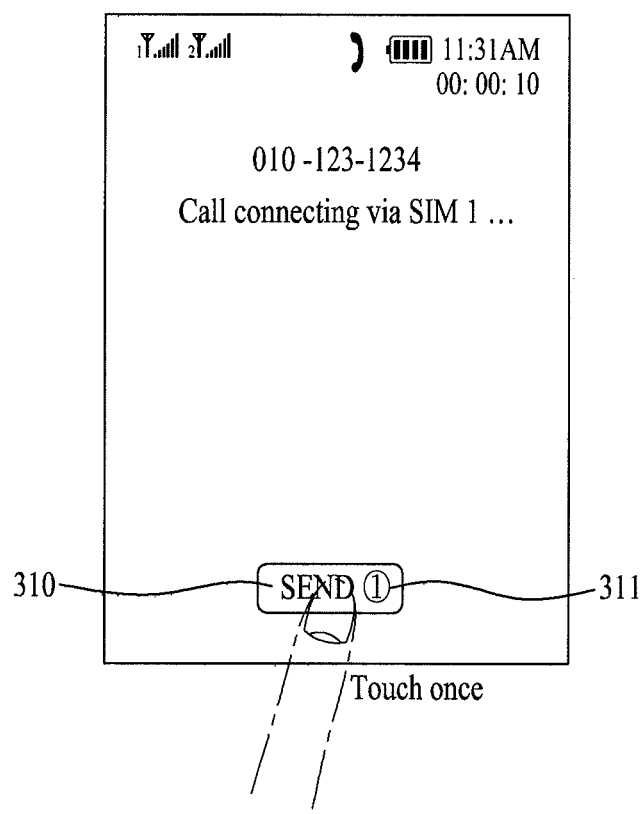
Figure 8C:
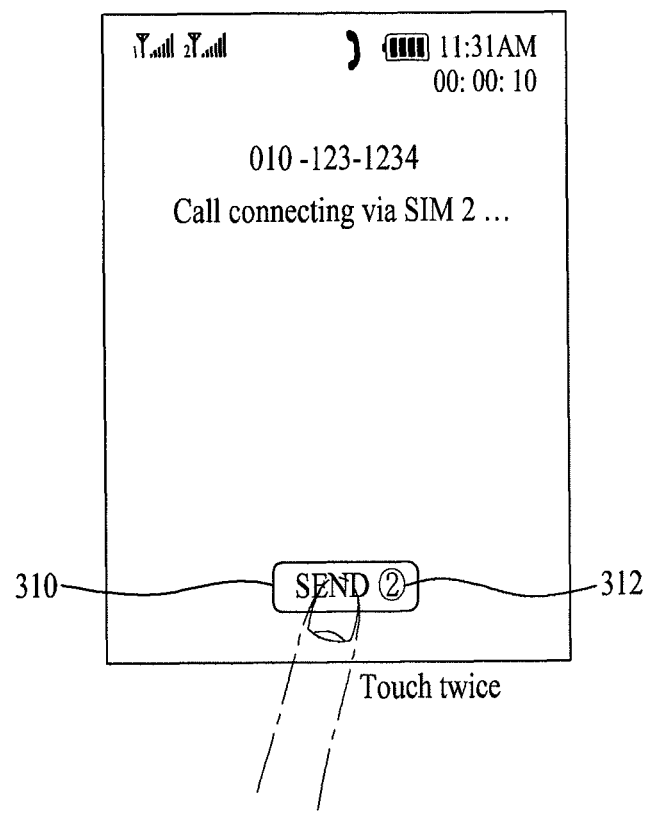

Referring to FIGS. 8A to 8C, the controller 180 can select either SIM 1 or SIM 2 to use for an audio call transmission according to a count or number of touch actions performed on a send key zone 310. For instance, when receiving an input of one touch to the send key zone 310, the mobile terminal 100 can transmit an audio call using the SIM 1 and display identity information '①' 311 of the SIM 1 on the send key zone 310 as shown in FIG. 8B.

Moreover, when receiving an input of two touches to the send key zone 310, the mobile terminal 100 can transmit an audio call using the SIM 2 and display identity information '②' 312 of the SIM 2 on the send key zone 310 as shown in FIG. 8C. Further, a touch count per identity module can be designated by the user or be preset by the mobile terminal 100.

Figure 9A:
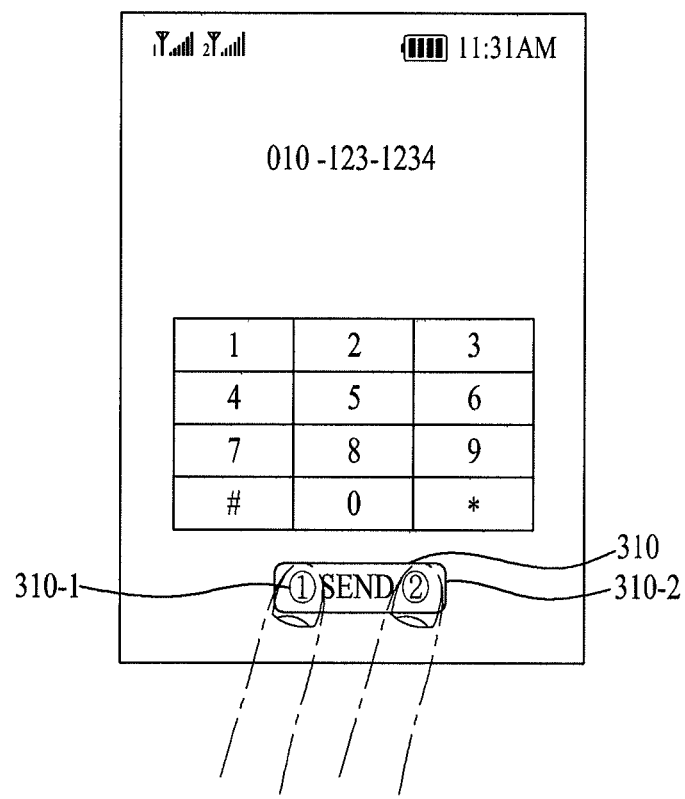
Figure 9B:
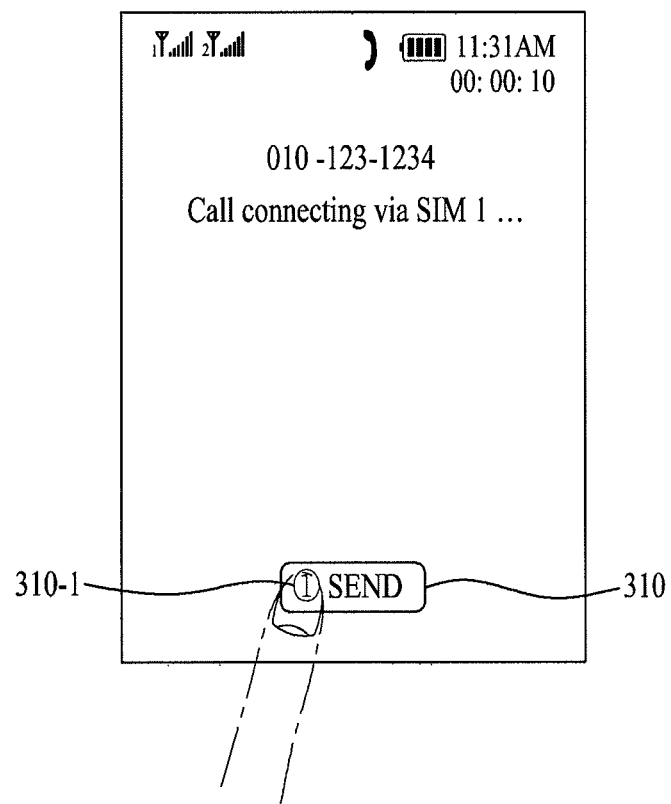
Figure 9C:
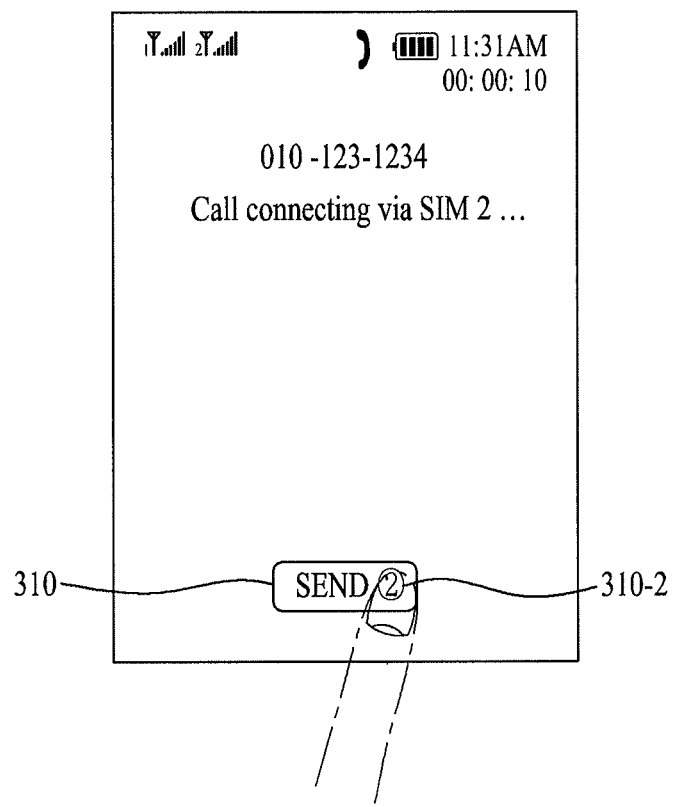

Next, referring to FIGS. 9A to 9C, a first point 310-1 corresponding to the SIM 1 and a second point 310-2 corresponding to the SIM 2 are included on the send key zone 310 of the mobile terminal 100. The controller 180 can then select either the SIM 1 or SIM 2 to use for an audio call transmission according to a point selected by a user. For instance, when receiving an input of a touch to the first point 310-1 of the send key zone 310, the mobile terminal 100 can transmit an audio call using the SIM 1 as shown in FIG. 9B.

Moreover, when receiving an input of a touch to the second point 310-2 of the send key zone 310, the mobile terminal 100 can transmit an audio call using the SIM 2 as shown in FIG. 9C. Also, a point per identity module can be designated by the user or be preset by the mobile terminal 100.

Figure 10A:
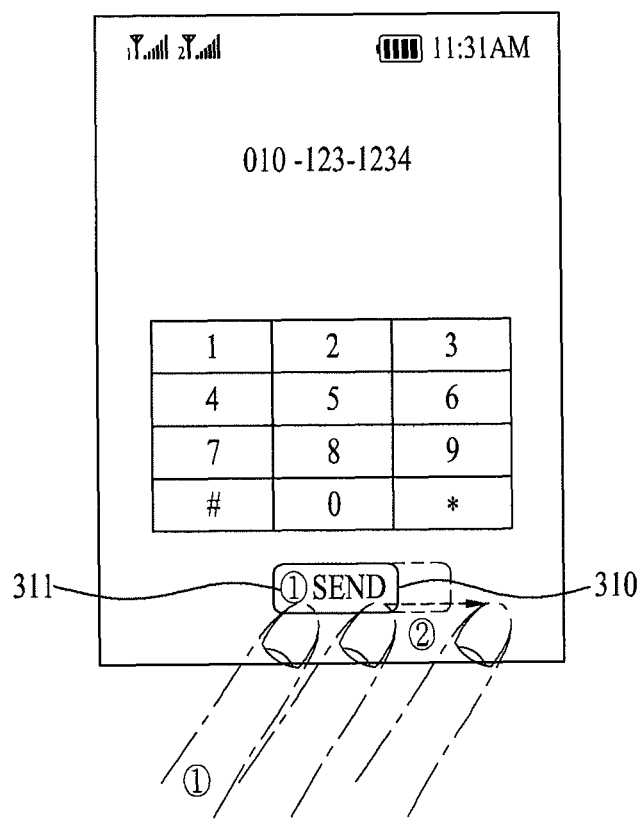
Figure 10B:
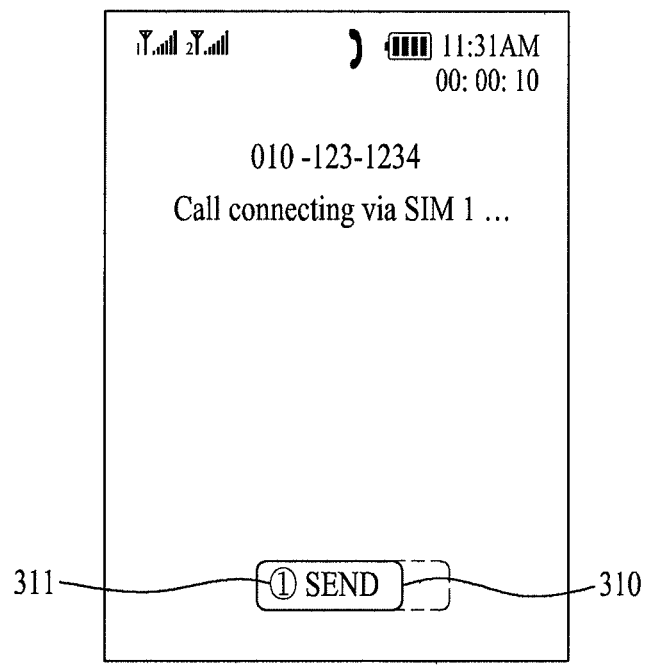
Figure 10C:
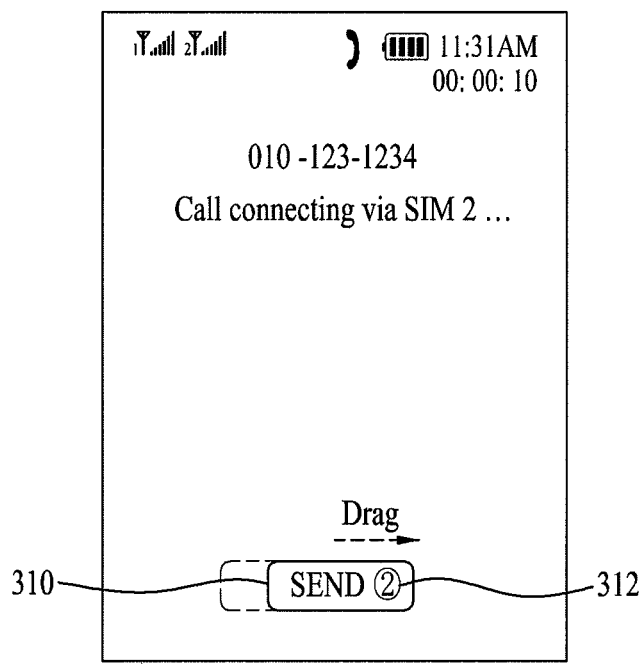

Referring to FIGS. 10A to 10C, when the SIM 1 is designated as a priority identity module, the mobile terminal 100 can display identity information '①' 311 of the SIM 1 on the send key zone 310 before receiving an input of a touch action from the user as shown in FIG. 10A. For instance, when receiving an input of a touch action performed on one point of the send key zone 310, the mobile terminal 100 can transmit an audio call using the SIM 1 as shown in FIG. 10B.

Moreover, when receiving an input of a touch & drag action in one direction of the send key zone 310, the mobile terminal 100 can transmit an audio call using the SIM 2 and display identity information '②' 312 of the SIM 2 on the send key zone 310 as shown in FIG. 10C. In addition, the priority identity module can be designated by the user or be preset by the mobile terminal 100.

Figure 11A:
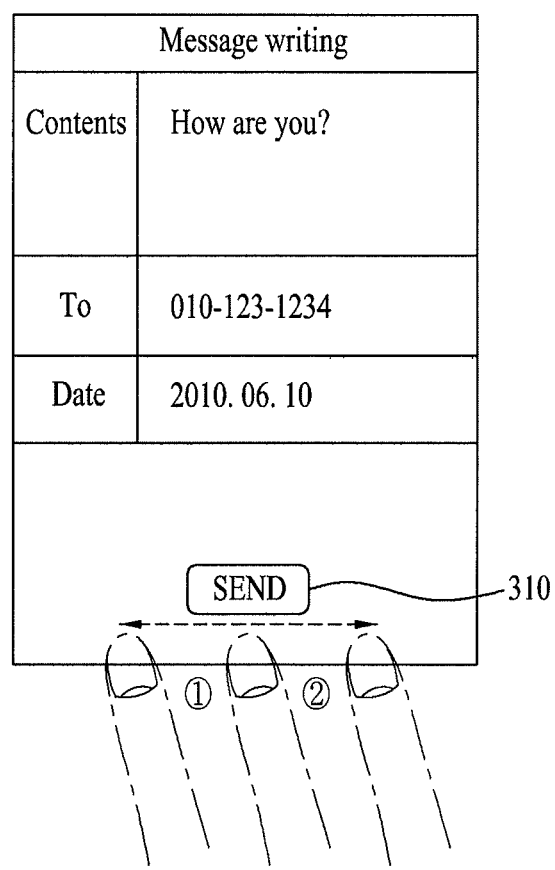
FIGS. 11A to 11C are diagrams of screen configurations for sending a message using an identity module indicated by a touch pattern of a touch action performed on a send key zone according to one embodiment of the present invention.
Figure 11B:
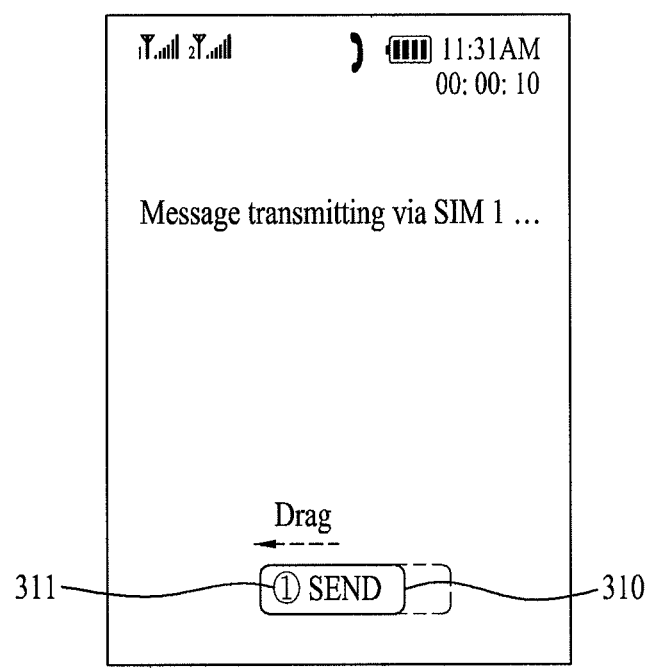
Figure 11C:
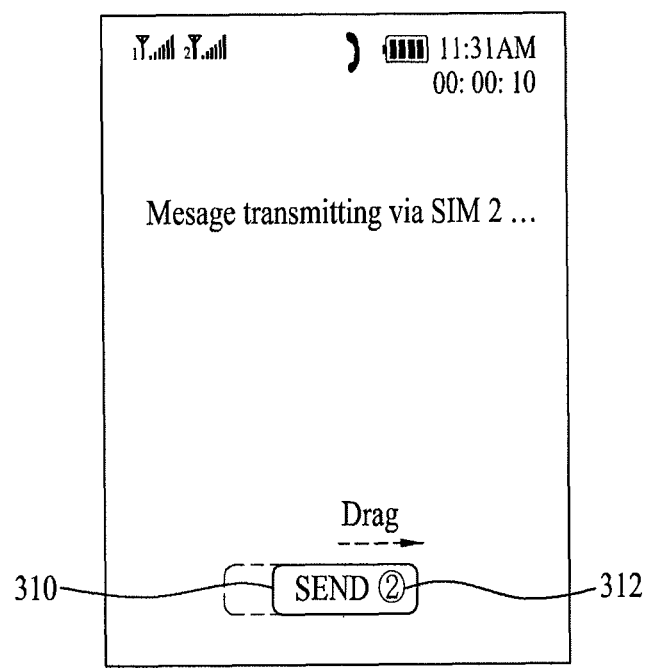

Next, FIGS. 11A to 11C are diagrams of screen configurations for sending a message using an identity module indicated by a touch pattern of a touch action performed on a send key zone according to an embodiment of the present invention. In this example, the communication data is a message. For clarity and convenience of the following description, the user has already input the message content and counterpart information of a message receiving side. The first and second identity modules 210 and 220 also include the SIM 1 and SIM 2, respectively.

Referring to FIGS. 11A to 11C, the controller 180 can select either the SIM 1 or SIM 2 to use for a message transmission according to a direction of a touch & drag performed on a send key zone 310. For instance, when receiving an input of a touch & drag action ① in a left direction of the send key zone 310, the mobile terminal 100 can transmit a message using the SIM 1 and display identity information '①' 311 of the SIM 1 on the send key zone 310 as shown in FIG. 11B. Moreover, when receiving an input of a touch & drag action ② in a right direction of the send key zone 310, the mobile terminal 100 can transmit a message using the SIM 2 and display identity information '②' 312 of the SIM 2 on the send key zone 310 as shown in FIG. 11C.

Further, the former embodiments for the touch action input for the send key zone 310 and the corresponding selection of the identity module shown in FIGS. 6A to 10C are also applicable to this message transmission. In addition, the controller 180 can select a SIM to use for an audio call transmission or a message transmission in accordance with a speed of a touch & drag action performed on the send key zone 310. For instance, if the touch & drag action speed is 10 cm/s, the mobile terminal 100 can select the SIM 1, and if the touch & drag action speed is 20 cm/s, the mobile terminal 100 can select the SIM 2.

Further, when a touch pressure or size for the send key zone 310 is smaller than a first reference, the mobile terminal 100 can select the SIM 1, and when a touch pressure or size for the send key zone 310 is equal to or greater than a first reference, the mobile terminal 100 can select the SIM 2. Also, when a proximity touch distance for the send key zone 310 is a first distance, the mobile terminal 100 can select the SIM 1, and when a proximity touch distance for the send key zone 310 is a second distance, the mobile terminal 100 can select the SIM 2.

Also, according to an embodiment of the present invention, if a priority identity module corresponding to the first identity module 210 or the second identity module 220 is in a poor communication state, the mobile terminal 100 can display identity information on the first or second identity module, which is not the priority identity module, on the send key zone 310.

Figure 12A:
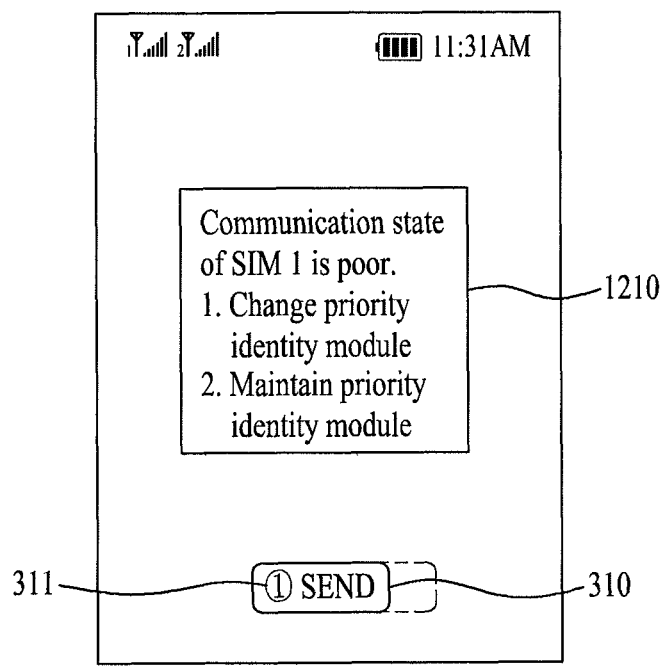
FIGS. 12A and 12B are diagrams of screen configurations displaying second identity information on a send key zone if a first identity module, which is a priority identity module, is in a poor communication state according to one embodiment of the present invention.
Figure 12B:
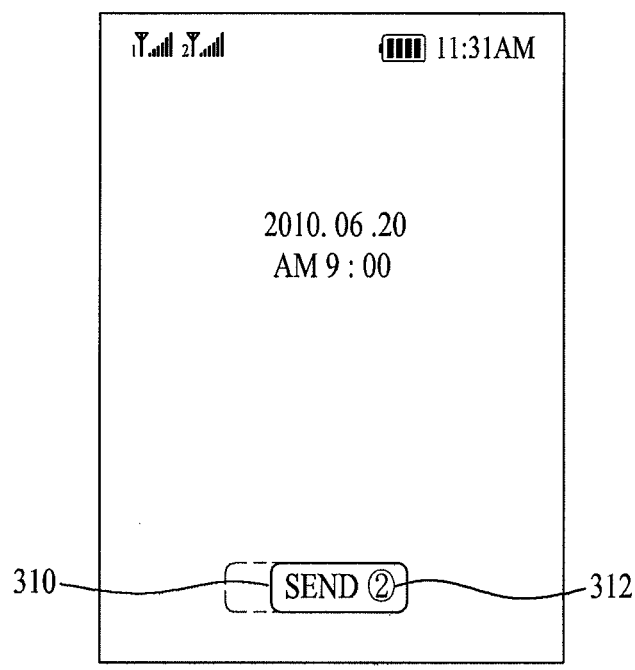

In more detail, FIGS. 12A and 12B are diagrams of screen configurations for displaying second identity information on a send key zone if a first identity module, which is a priority identity module, is in a poor communication state according to an embodiment of the present invention. Referring to FIG. 12A, if a communication state of the SIM 1 (i.e., the priority identity module) is poor, the mobile terminal 100 can display a window 1210 for enabling a user to select whether to change the priority identity module.

Referring to FIG. 12B, if the user selects 'change priority identity module' in FIG. 12A, the controller 180 changes the priority identity module to be set to the SIM 2 from the SIM 1 and displays identity information '②' 312 of the SIM 2 on the send key zone 310 instead of identity information '①' 311 of the SIM 1 as shown in FIG. 12B.

Alternatively, if a communication state of the SIM 1 (i.e., the priority identity module) is poor, the mobile terminal 100 can automatically change the priority identity module to be set to the SIM 2 from the SIM 1 irrespective of a selection made by a user. In addition, if the communication state corresponding to the SIM 1 is restored, the mobile terminal 100 can set the priority identity module to the SIM 1 again or can keep setting the priority identity module to the SIM 2 according to a selection made by a user or terminal.

Also, according to an embodiment of the present invention, when connecting a first call and a second call using the first and second identity modules 210 and 220, the controller 180 can display an end key zone on a prescribed region of a touchscreen and receives an input of a touch action performed on the end key zone from the user. For instance, when connecting a first call and a second call, the mobile terminal 100 can output an audio signal or a video signal (for a video call) transceived via either the first call or the second call.

The controller 180 also determines whether a touch pattern of the input touch action indicates an end command for the first call or an end command for the second call. The controller 180 also controls the wireless communication unit 110 to end either the first call or the second call indicated by the touch pattern according to a result of the determination.

A process for inputting a touch action performed on an end key zone and ending a call using an identity module indicated by a touch pattern will now be explained with reference to FIGS. 13A to 14C. In more detail, FIGS. 13A to 14C are diagrams of screen configurations for ending a call using an identity module indicated by a touch pattern of a touch action performed on an end key zone when the first and second calls are connected using the first and second identity modules according to an embodiment of the present invention.

Figure 13A:
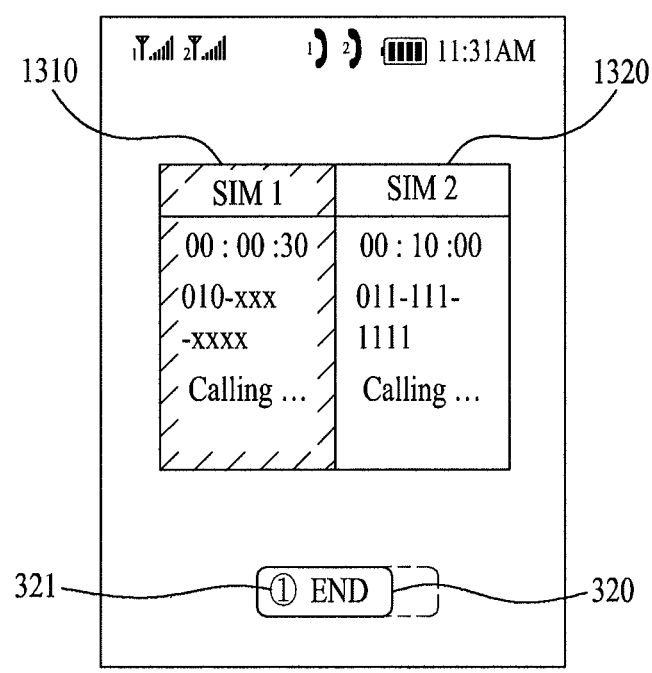
FIGS. 13A to 14C are diagrams of screen configurations for ending a call using an identity module indicated by a touch pattern of a touch action performed on an end key zone if first and second calls are connected using first and second identity modules according to one embodiment of the present invention.
Figure 13B:
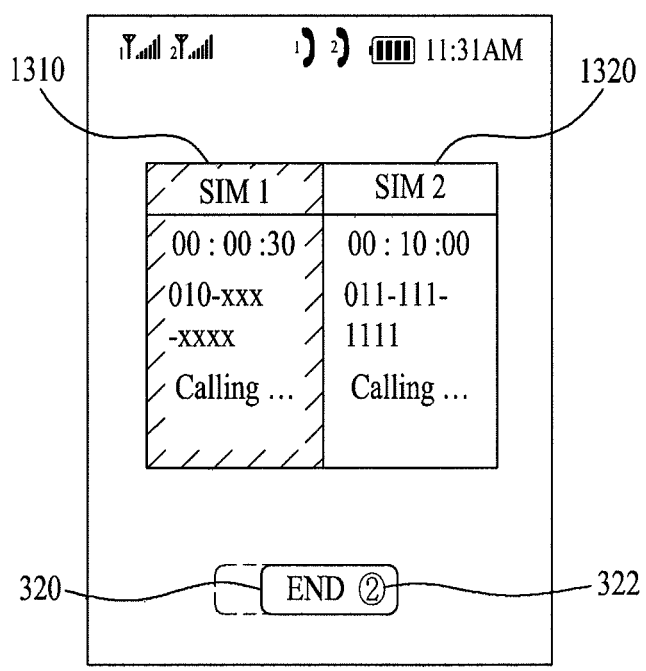

Referring to FIGS. 13A and 13B, while a first call and a second call are connected, the mobile terminal 100 displays information (e.g., counterpart phone number, call duration, etc.) 1310 on the first call and information (e.g., counterpart phone number, call duration, etc.) 1320 on the second call and also displays an end key zone 320 on a prescribed region of the screen.

Figure 13C:
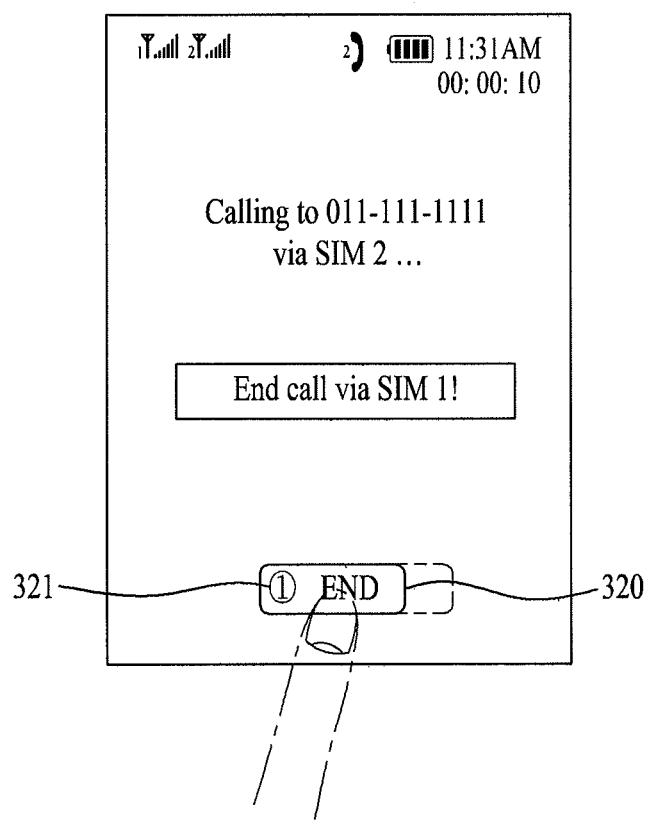

Also, referring to FIG. 13B, if the SIM 1 is set to the priority identity module, and when an audio signal according to the first call is output or the information 1310 on the first call is selected, the controller 180 displays identity information '①' 321 of the SIM 1 on the end key zone 320. Referring to FIG. 13C, if the SIM 2 is set as the priority identity module, when an audio signal according to the second call is output or the information 1320 on the second call is selected, the controller 180 displays identity information '②' 322 of the SIM 2 on the end key zone 320.

Figure 13D:
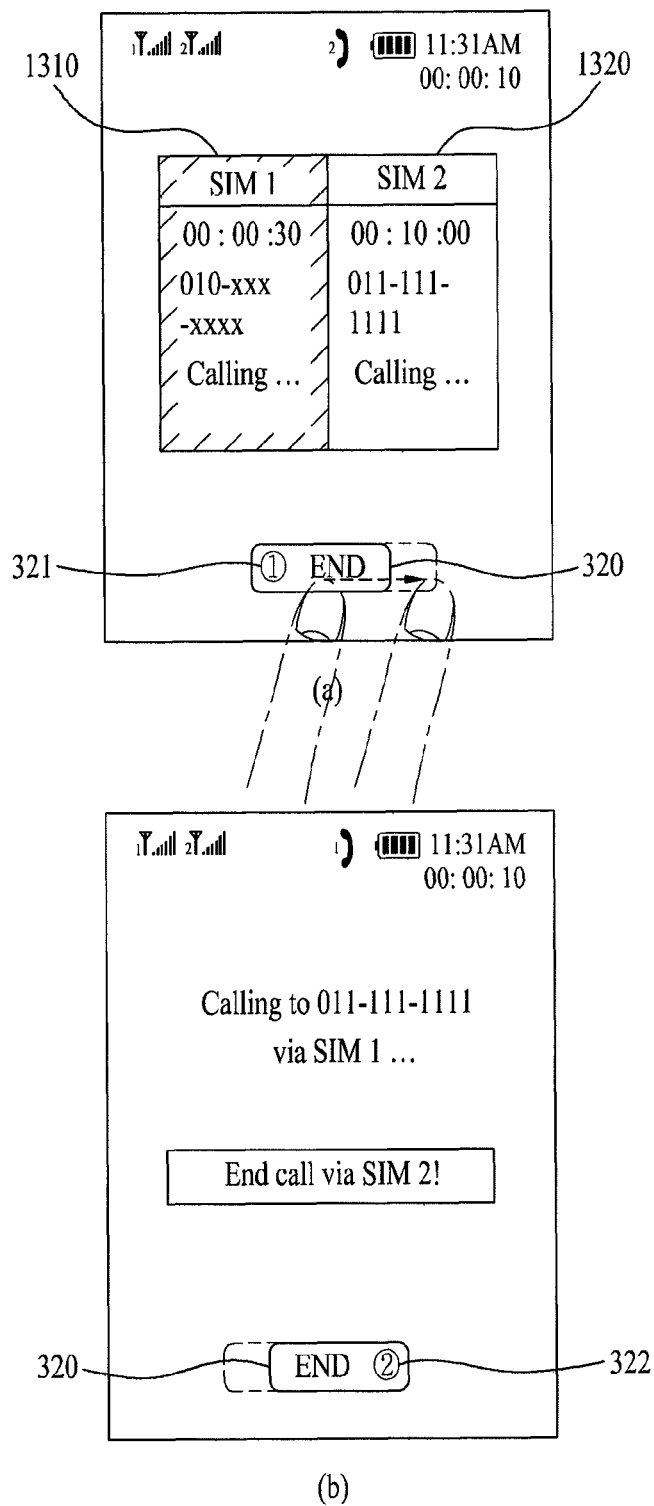

Referring to FIGS. 13C and 13D, while the identity information 321 of the SIM 1 is displayed on the end key zone 320 (see FIG. 13C), and when receiving an input of a touch & drag action performed on the end key zone 320, the controller 180 ends the second call by displaying the identity information 322 on the SIM 2 on the end key zone 320 (see FIG. 13D).

Figure 14A:
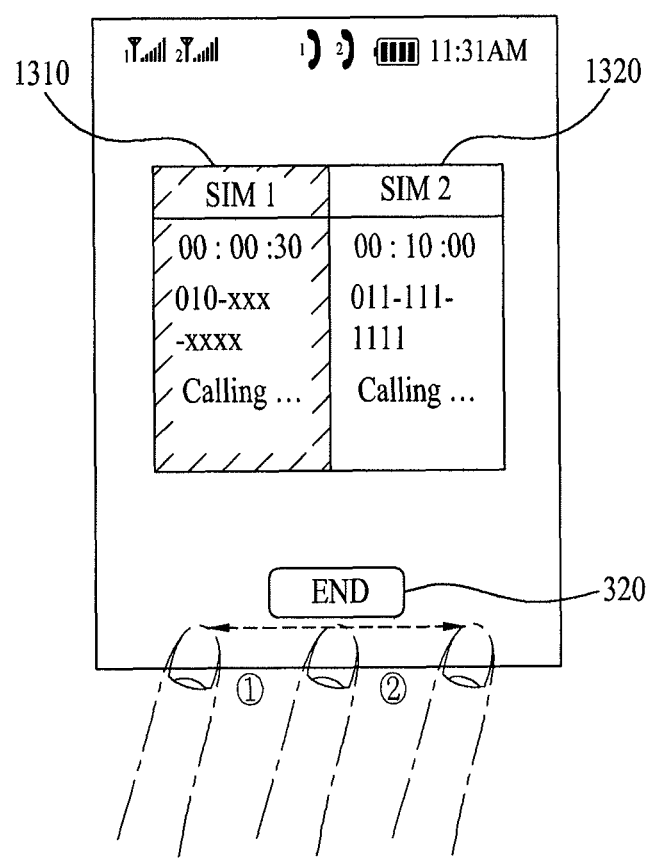
Figure 14B:
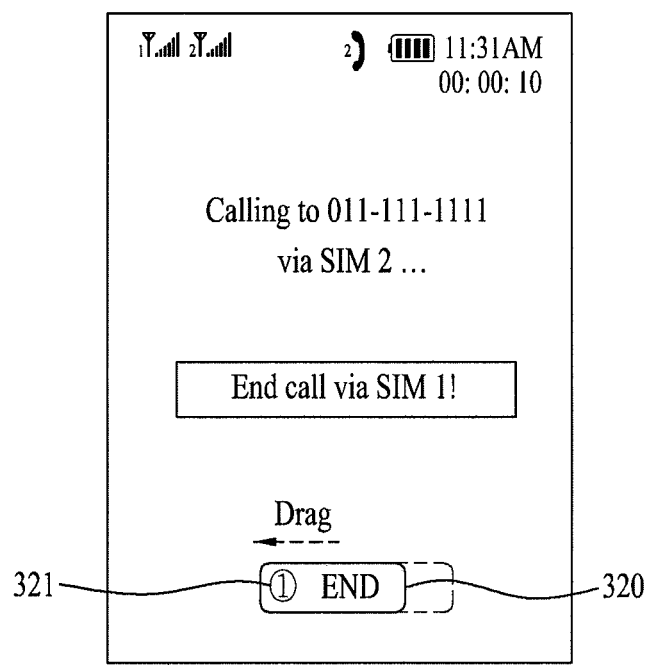
Figure 14C:
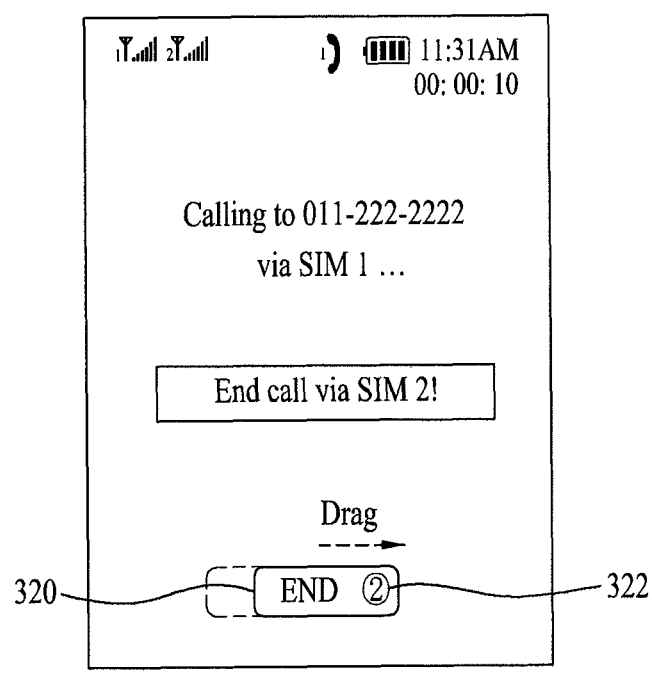

Referring to FIGS. 14A to 14C, the mobile terminal 100 can selectively end the first call or the second call according to a direction of a touch & drag operation performed on the end key zone 320. For instance, when receiving a touch & drag action ① in a left direction of the end key zone 320, the mobile terminal 100 ends the first call using the SIM 1 and displays the identity information '①' 321 of the SIM 1 on the end key zone 320 as shown in FIG. 14B. In another example, when receiving a touch & drag action ② in a right direction of the end key zone 320, the mobile terminal 100 ends the second call using the SIM 2 and displays the identity information '②' 322 of the SIM 2 on the end key zone 320 as shown in FIG. 14C.

Further, if a touch & drag distance is equal to or greater than a predetermined reference, a touch action is removed or a retouch action is performed on the end key zone 320 after removal of the touch action, the mobile terminal 100 ends the corresponding call. Moreover, the former embodiments for the touch action input to the end key zone 310 and the corresponding identity module selection regarding the audio call transmission (shown in FIGS. 6A to 10C) are also applicable to the end call operation.

Thus, according to an embodiment of the present invention, when receiving communication data using a specific one of the first identity module 210 and the second identity module 220, the controller 180 displays identity information of the specific identity module on a send key zone. Further, a user of a counterpart terminal can designate a terminal on a communication data receiving side by inputting a phone number corresponding to the specific identity module. This embodiment will now be explained in more detail with reference to FIG. 15A and FIG. 15B.

Figure 15A:
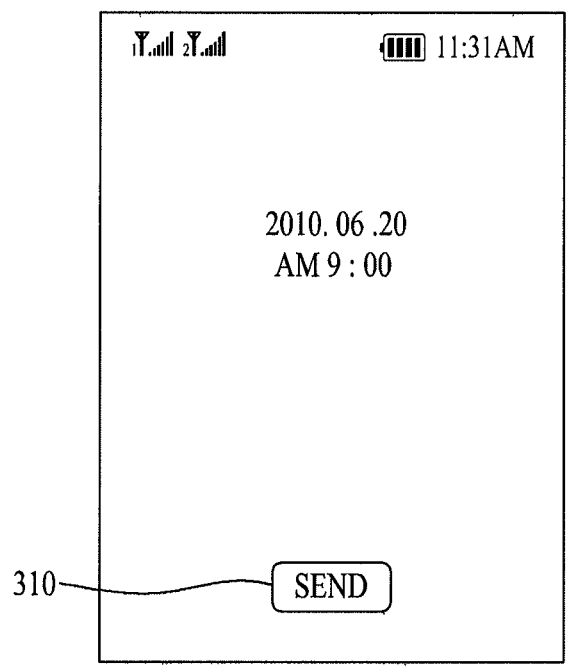
FIGS. 15A and 15B are diagrams of screen configurations displaying second identity information on a send key zone when receiving a call using a second identity module according to one embodiment of the present invention.
Figure 15B:
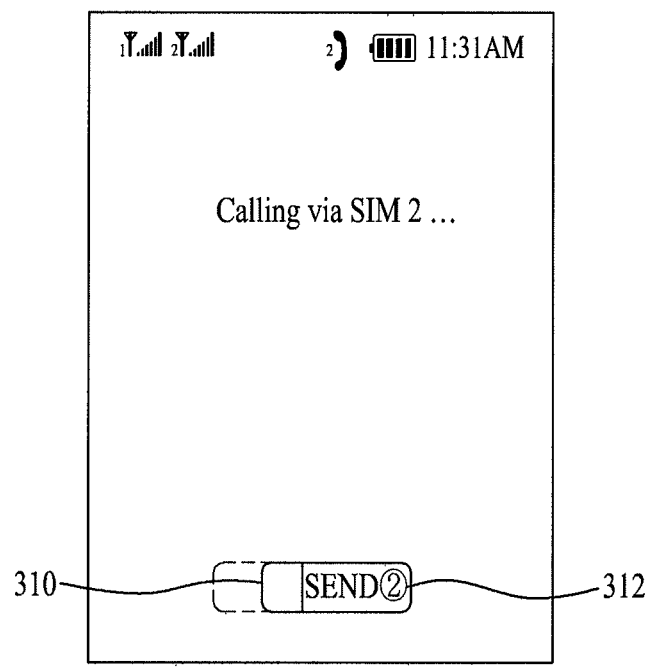

In particular, FIGS. 15A and 15B are diagrams of screen configurations for displaying second identity information on a send key zone when receiving a call using a second identity module according to an embodiment of the present invention. Referring to FIG. 15A, the mobile terminal 100 displays the send key zone 310 on a standby picture. Also, when receiving a call using the SIM 2, the mobile terminal 100 displays identity information '②' 312 of the SIM 2 on the send key zone 310 as shown in FIG. 15B.

A method of controlling a communication list display in a mobile terminal will now be explained with reference to FIGS. 16 to 20C. In particular, FIG. 16 is a flowchart illustrating a method of displaying a communication list in a mobile terminal according to one embodiment of the present invention.

Figure 16:
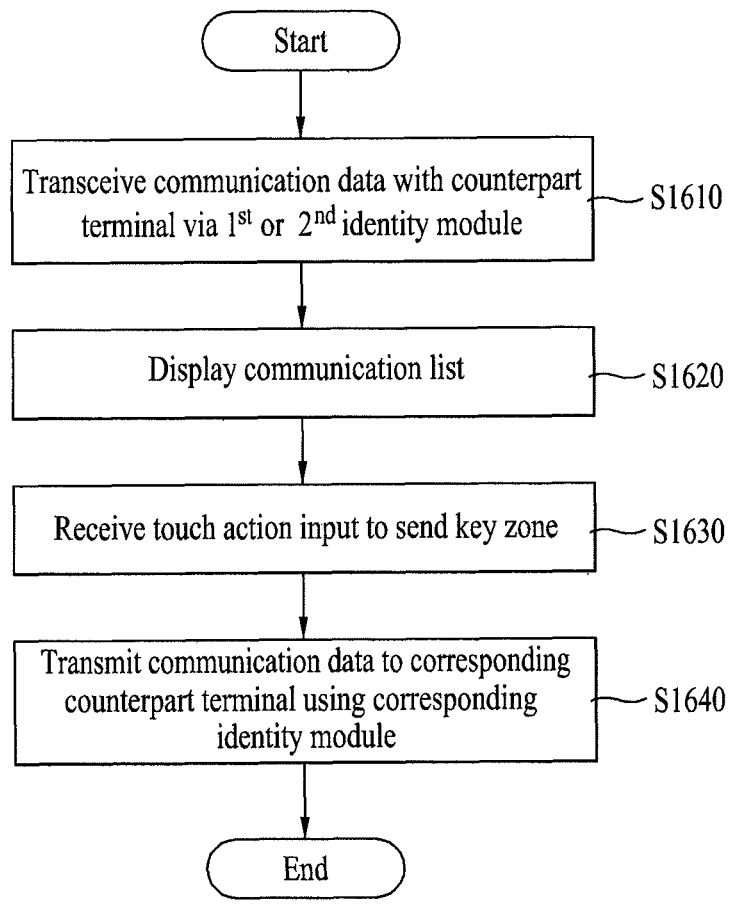
FIG. 16 is a flowchart illustrating a method of displaying a communication list in a mobile terminal according to one embodiment of the present invention.

Referring to FIG. 16, the controller 180 of the mobile terminal 100 transceives communication data with at least one counterpart (other) terminal using at least one of the first identity module 210 and the second identity module 220 (S1610). Further, the transceiving step S1610 can be performed by the wireless communication unit 110.

The controller 180 then displays a communication list including counterpart information of the at least one counterpart terminal having transceived the communication data in the transceiving step S1610 on the touchscreen (S1620). In this instance, the counterpart information is included in the communication list per communication data transceived or can be included in the communication list per counterpart terminal. In the latter case, even if the communication data are transceived with a specific counterpart terminal plural times, one counterpart information can be included in the communication list.

Moreover, the counterpart information can include a phone number of a corresponding counterpart terminal, a title/name of a corresponding counterpart terminal linked to a phonebook related application, a corresponding call duration, a corresponding call date/hours (or a corresponding message transceived hour) and the like. In addition, the mobile terminal 100 can also display identity information on a corresponding identity module having transceived the corresponding communication data as counterpart information included in the communication list.

For instance, when the counterpart information included in the communication list is generated per communication data transceived with a counterpart terminal, the mobile terminal 100 can display identity information of a corresponding identity module used in transceiving the corresponding communication data for each counterpart information as the counterpart information. In another instance, when the counterpart information included in the communication list is generated per counterpart terminal, the mobile terminal 100 can display identity information of an identity module used in transceiving the last communication data with the corresponding counterpart terminal as the counterpart information.

In still another instance, the mobile terminal 100 can display a send key zone (hereinafter named an individual send key zone) for displaying identity information of a corresponding identity module for each counterpart information included in the communication list. In this instance, the corresponding identity module can include an identity module used in transceiving communication data with a counterpart terminal corresponding to the counterpart information (when generating counterpart information per communication data). Alternatively, the corresponding identity module can include an identity module used in transceiving last communication data with a counterpart terminal corresponding to the counterpart information (when generating counterpart information per counterpart terminal).

The mobile terminal 100 also displays a representative send key zone on a prescribed region of a screen and displays identity information of an identity module having transceived communication data corresponding to specific counterpart information selected from the communication list on the representative send key zone. Therefore, the identity information displayed on the send key zone can be changed according to what kind of counterpart information is selected from the communication list.

A communication list display will now be explained in more detail with reference to FIGS. 17A to 17C. In this example, the counterpart information included in the communication list is generated per transceived communication data. In more detail, FIGS. 17A to 17C are diagrams of screen configurations for displaying a communication list constructed with counterpart information including identity information of a corresponding identity module according to an embodiment of the present invention.

Figure 17A:
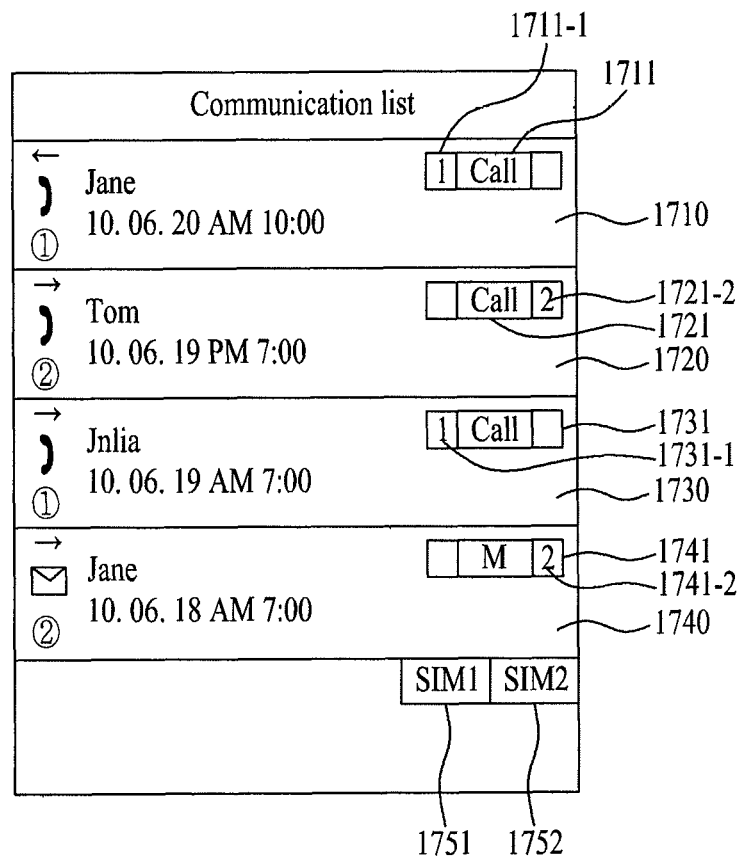
Figure 17C:
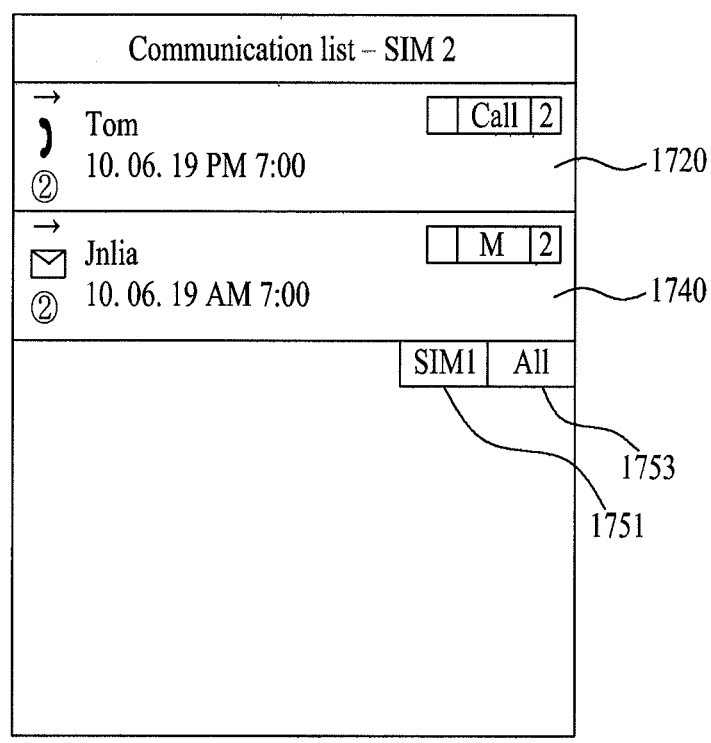

Referring to FIG. 17A, the mobile terminal 100 displays a communication list including a plurality of counterpart informations 1710 to 1740. In particular, each of the counterpart informations can include a communication data type (e.g., a presence or non-presence of an audio call_, a presence or non-presence of a video call, a presence or non-presence of a text message, a presence or non-presence of a multimedia message, etc.), a presence or non-presence of transceiving (e.g., transmit_→, receive_←, etc.), identity information (SIM 1_①, SIM 2_②) of a corresponding identity module, a corresponding counterpart name, a corresponding communication data transceived time (hour/min etc.), and the like.

Each of the counterpart informations can also include a corresponding one of individual send key zones 1711 to 1741. Further, identity information 1711-1, 1721-2, 1731-1 and 1741-2 of the SIM used in transceiving the corresponding communication data can be displayed on the individual send key zones 1711 to 1741, respectively.

Referring to FIG. 17B, the mobile terminal 100 displays a communication list including counterpart information 1710 and 1730 corresponding to the communication data transceived using the SIM 1 only. In particular, when the indicator SIM 1 1751 is selected in FIG. 17A or FIG. 17C, the communication list shown in FIG. 17B is displayed.

Referring to FIG. 17C, the mobile terminal 100 displays a communication list including counterpart information 1720 and 1740 corresponding to the communication data transceived using the SIM 2 only. In particular, when the indicator SIM 2 1752 is selected in FIG. 17A or 17B, the communication list shown in FIG. 17C can be displayed. Also, if the indicator 'All' 1753 is selected in FIG. 17B or 17C, the mobile terminal 100 returns to the state shown in FIG. 17A.

Referring again to FIG. 16, the mobile terminal 100 receives an input of a touch action performed on the individual send key zone (S1630). Regarding the touch action input in the inputting step S1630 and a touch pattern of the input touch action, the descriptions of the former inputting step S430 and the former determining step S440 in FIG. 3 are used.

The controller 180 also determines whether the touch pattern of the input touch action is a command (hereinafter named a first transmission command) for transmitting communication data using a corresponding identity module or a command (hereinafter named a second transmission command) for transmitting communication data using another identity module different from the corresponding identity module.

For instance, if the touch pattern is a single touch to a prescribed point of an individual send key zone less than a predetermined duration, the mobile terminal 100 determines that the touch pattern is the first transmission command. If the touch pattern is a touch & drag operation to a prescribed point of an individual send key zone, multiple touches to a prescribed point or a touch to a prescribed point greater or equal to a predetermined duration, the mobile terminal 100 determines that the touch pattern is the second transmission command.

According to the determination result, the controller 180 transmits the communication data to the corresponding counterpart terminal using the first identity module 210 when the first transmission command is used. When the second transmission command is used, the controller 180 transmits the communication data to the corresponding counterpart terminal using the second identity module 220 (S1640). Further, the transmitting step S1640 can be performed by the wireless communication unit 110.

In addition, the corresponding counterpart terminal can include a counterpart terminal corresponding to the counterpart information including the individual send key zone to which the touch action was input. Moreover, the communication data transmitted in the transmitting step S640 can have the same type of the communication data corresponding to the counterpart information including the individual send key zone to which the touch action was input. Communication data of a different type according to a user selection can also be transmitted as well.

An input of a touch action performed on an individual send key zone and a corresponding communication data transmitting operation will now be described. In more detail, FIGS. 18A to 18D are diagrams of screen configurations for transmitting a call to a specific counterpart terminal using an identity module indicated by a touch pattern of a touch action performed on a send key zone included in specific counterpart information according to an embodiment of the present invention.

Figure 18A:
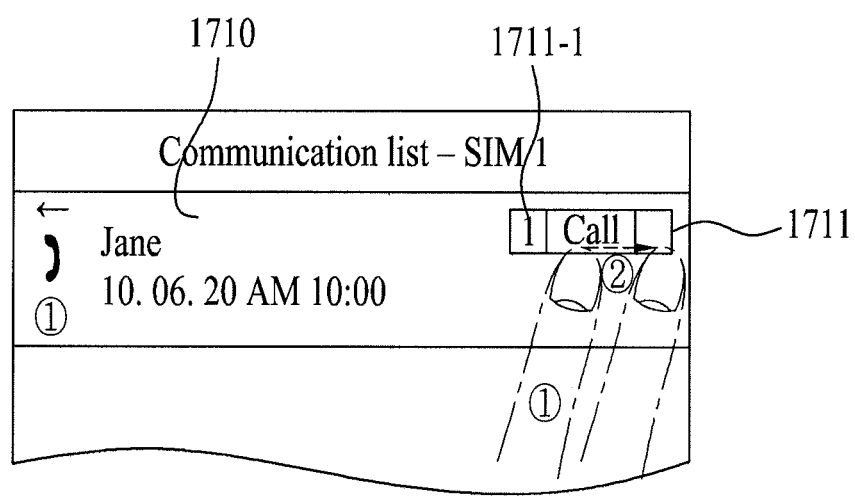
FIGS. 18A to 18D are diagrams of screen configurations for transmitting a call to a specific counterpart terminal using an identity module indicated by a touch pattern of a touch action performed on a send key zone included in specific counterpart information according to one embodiment of the present invention.

Referring to FIG. 18A, the mobile terminal 100 receives an input of a touch action performed on a first individual send key zone 1711 included in a first counterpart information 1710. In this instance, because the identity module corresponding to the first counterpart information 1710 is the SIM 1, the mobile terminal 100 displays an identity information 1711-1 of the SIM 1 on the first individual send key zone 1711.

Figure 18B:
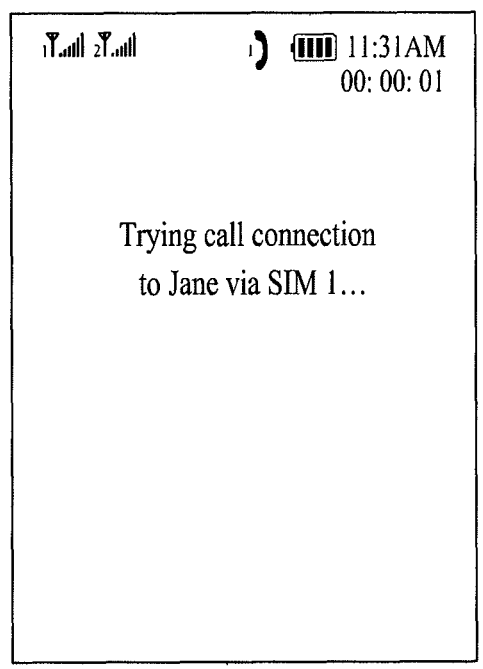

Also, when a touch ① to a prescribed point of the first individual send key zone 1711 is input in FIG. 18A [①], the mobile terminal 100 transmits an audio call to a counterpart terminal corresponding to the first counterpart information 1710 using the SIM 1 as shown in FIG. 18B. Also, when a touch & drag operation ② from a prescribed point of the first individual send key zone 1711 is input in FIG. 18A, the mobile terminal 100 transmits an audio call to a counterpart terminal corresponding to the first counterpart information 1710 using the SIM 2 as shown in FIG. 18C.

Figure 18C:
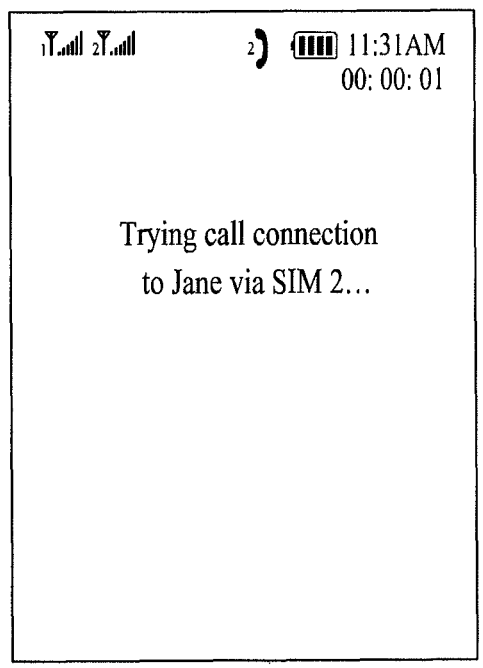

Also, because communication data corresponding to the first counterpart information 1710 is an audio call, the mobile terminal 100 transmits an audio call to a counterpart terminal, as shown in FIG. 18B or 18C. The mobile terminal 100 can also transmit communication data of a type different from the former communication data corresponding to the first counterpart information 1710 according to a user selection.

Figure 18D:
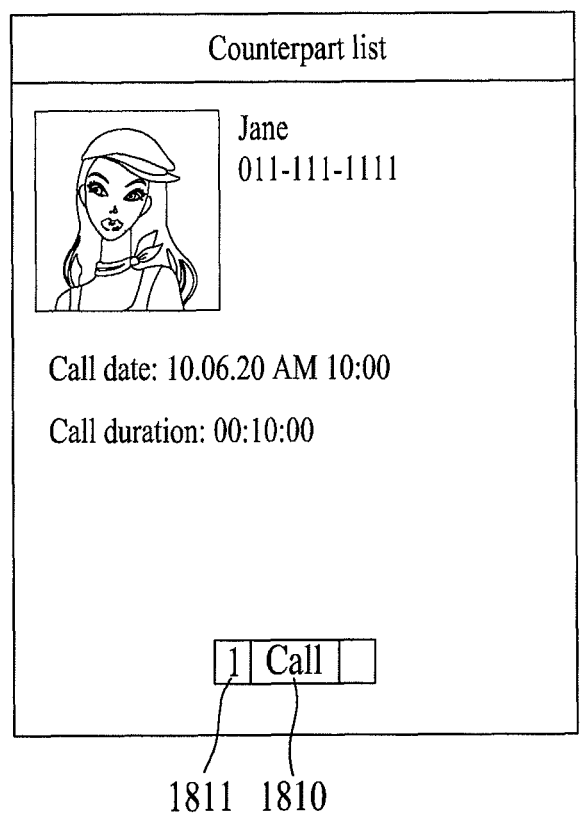

In addition, when receiving an input of a check command of the first counterpart information 1710 in FIG. 18A, the mobile terminal 100 displays detailed information corresponding to the first counterpart information 1710 on the screen as shown in FIG. 18D. That is, the mobile terminal 100 displays a send key zone 1810, which is marked with an identity information '1' 1811 of the identity module (SIM 1) corresponding to the first counterpart information 1710 on a prescribed region of the screen.

Figure 19A:
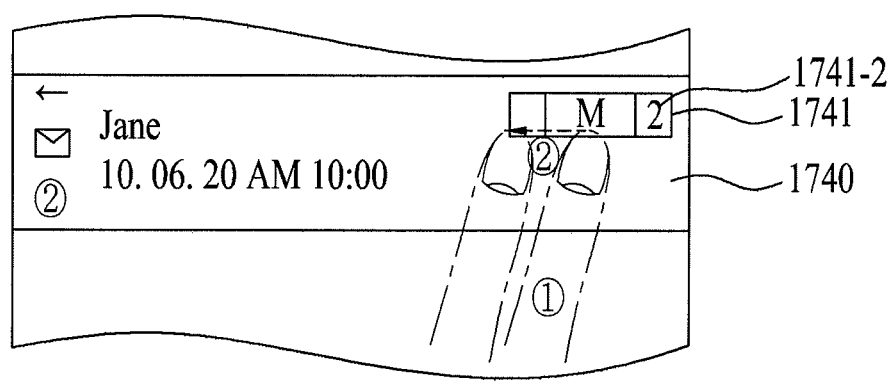
Figure 19B:
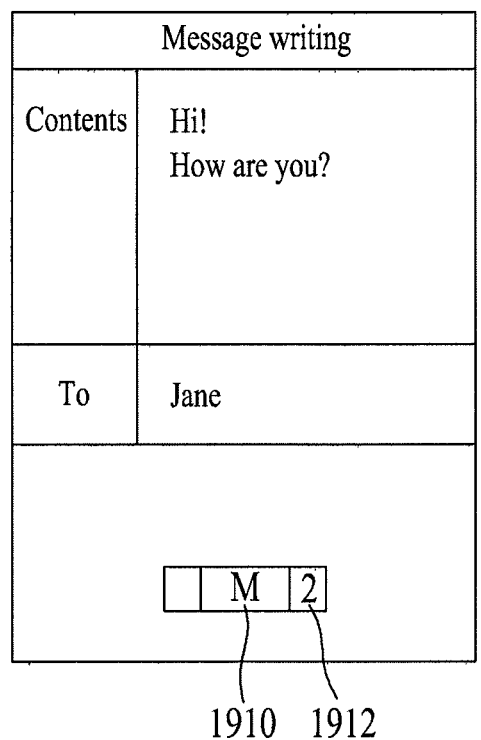

Next, FIGS. 19A to 19C are diagrams of screen configurations for sending a message to a specific counterpart terminal using an identity module indicated by a touch pattern of a touch action performed on a send key zone included in specific counterpart information according to an embodiment of the present invention. In this example, the communication data includes a message.

Referring to FIG. 19A, the mobile terminal 100 receives an input of a touch action performed on a fourth individual send key zone 1741 included in a fourth counterpart information 1740. Further, because an identity module corresponding to the fourth counterpart information 1740 is the SIM 2, the mobile terminal 100 displays an identity information 1741-2 of the SIM 2 on the fourth individual send key zone 1741.

In addition, if a touch ① to a prescribed point of the fourth individual send key zone 1741 is input in FIG. 19A, the mobile terminal 100 enters a writing state of a message to send to a counterpart terminal corresponding to the fourth counterpart information 1740 and displays a send key zone 1910 marked with the identity information 1912 of the SIM 2 on a prescribed region of the screen as shown in FIG. 19B.

Further, using the SIM 2 for receiving an input of a touch to a prescribed point of the send key zone 1910 shown in FIG. 19B or using the SIM 1 for receiving an input of a touch & drag, the mobile terminal 100 can send the written message to the counterpart terminal corresponding to the fourth counterpart information 1740.

If a touch & drag operation ② from a prescribed point of the fourth individual send key zone 1741 is input in FIG. 19A, the mobile terminal 100 enters a writing state of a message to send to a counterpart terminal corresponding to the fourth counterpart information 1740 and displays a send key zone 1910 marked with the identity information 1911 of the SIM 1 on a prescribed region of the screen as shown in FIG. 19C. Further, using the SIM 1 for receiving an input of a touch to a prescribed point of the send key zone 1910 shown in FIG. 19C or using the SIM 2 for receiving an input of a touch & drag, the mobile terminal 100 can send the written message to the counterpart terminal corresponding to the fourth counterpart information 1740.

Figure 20A:
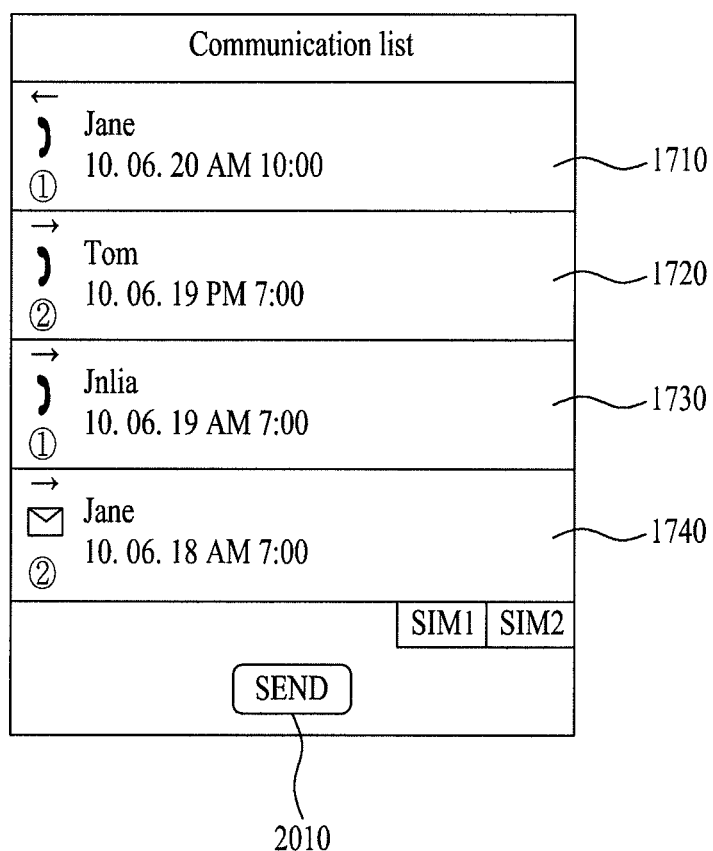
FIGS. 20A to 20C are diagrams of screen configurations for displaying identity information of a corresponding identity module when specific counterpart information is selected according to the present invention.
Figure 20B:
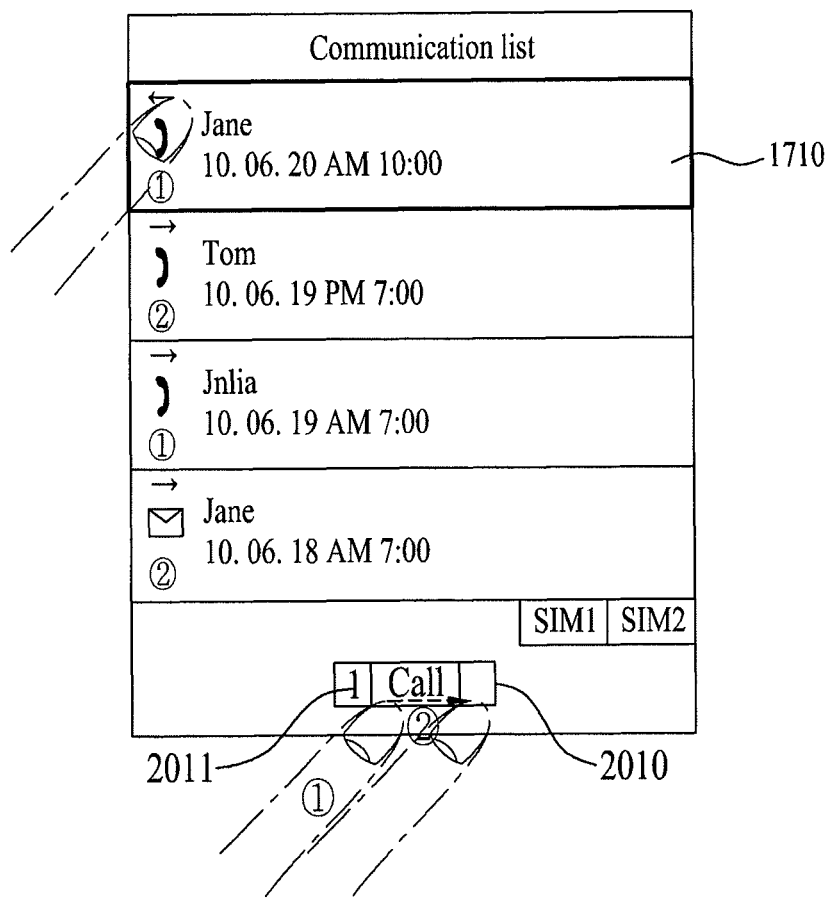
Figure 20C:
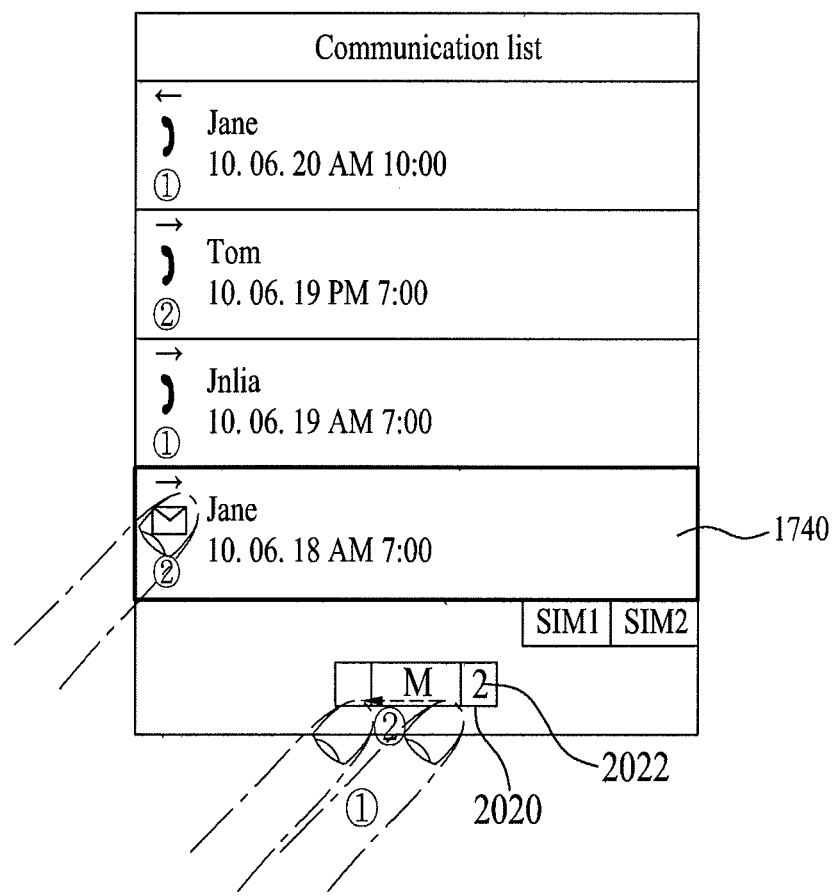

Next, FIGS. 20A to 20C are diagrams of screen configurations for displaying identity information of a corresponding identity module when the user selects that specific counterpart information according to an embodiment of the present invention. Referring to FIG. 20A, the mobile terminal 100 displays a communication list including a plurality of counterpart information 1710 to 1740 and also displays a representative send key zone 2010 on a prescribed region of the screen.

Referring to FIG. 20B, if the user selects a first counterpart information 1710 from the communication list, the mobile terminal 100 displays an identity information 2011 of an identity module (i.e., SIM 1) corresponding to the first counterpart information 1710 on the representative send key zone 2010.

Also, using the SIM 1 when receiving an input of a touch to a prescribed point of the representative send key zone 2010 shown in FIG. 20B or using the SIM 2 when receiving an input of a touch & drag, the mobile terminal 100 can send an audio call to the counterpart terminal corresponding to the first counterpart information 1710.

Referring to FIG. 20C, if a fourth counterpart information 1740 is selected from the communication list, the mobile terminal 100 can display an identity information 2022 of an identity module (i.e., SIM 2) corresponding to the fourth counterpart information 1740 on the representative send key zone 2020.

Moreover, using the SIM 2 when receiving an input of a touch to a prescribed point of the representative send key zone 2020 shown in FIG. 20C or using the SIM 1 when receiving an input of a touch & drag, the mobile terminal 100 can set a state for sending a message to the counterpart terminal corresponding to the fourth counterpart information 1740.

According to an embodiment of the present invention, the mobile terminal 100 can display a communication state information on a first identity module 210 and a communication state information on a second identity module 220. For instance, the mobile terminal can display an indicator indicating a signal strength of a communication via the first identity module 210 and an indicator indicating a signal strength of a communication via the second identity module 220.

Also, according to an embodiment of the present invention, when receiving an input of a touch & drag action operation performed on a send key zone (or an end key zone), the mobile terminal 100 can shift the send key zone to correspond to a touch & drag distance and direction. Further, even if a touch & drag action is input, the send key zone can be set not to move to correspond to the touch & drag distance and direction.

In addition, when a corresponding communication data is an audio call or a video call, a send key region mentioned in the foregoing description of the present invention can display information indicating the audio call or the video call. If a corresponding communication data is a message, the send key zone can display information indicating that message. The send or end key zone mentioned in the foregoing description of the present invention can also be set to differ in its functionality only in the same key zone for a call related operation.

Accordingly, embodiments of the present invention provide several advantages. First of all, an embodiment of the present invention can select a specific identity module to transmit communication data from a plurality of identity modules by determining a touch pattern of a touch action performed on a send key zone, thereby quickly performing a transmission command signal input and an identity module selection even though a plurality of the identity modules are provided.

Secondly, an embodiment of the present invention can display identity information of a corresponding identity module on a send key zone, thereby providing a user with information indicating which identity module will be used in transmitting communication data in a current status using the send key zone.

Thirdly, an embodiment of the present invention displays identity information of a corresponding identity module for each counterpart information on a communication list, thereby providing a user with information indicating which module has transceived communication data corresponding to specific counterpart information.

Finally, an embodiment of the present invention displays an individual send key zone, on which identity information of a corresponding identity module is displayed, for each counterpart information on a communication list, thereby transmitting communication data to a corresponding counterpart terminal according to an input of a touch action to the individual send key zone for each counterpart information.

Further, according to one embodiment of the present invention, the above-described methods can be implemented in a program recorded medium as computer-readable codes. The computer-readable media include all kinds of recording devices in which data readable by a computer system are stored. The computer-readable media include ROM, RAM, CD-ROM, magnetic tapes, floppy discs, optical data storage devices, and the like for example and also include carrier-wave type implementations (e.g., transmission via the Internet).

It will be apparent to those skilled in the art that various modifications and variations can be made in a mobile terminal and method of controlling communication data transmission and communication list display therein according to the present invention without departing from the spirit or scope of the inventions. Thus, it is intended that the present invention covers the modifications and variations of this invention provided they come within the scope of the appended claims and their equivalents. For instance, the respective configurations disclosed in the aforesaid embodiments of the present invention can be used by those skilled in the art in a manner of being combined with one another entirely or selectively in part.

What is claimed is:

1. A mobile terminal, comprising:
   at least a first identity module and a second identity module;
   a wireless communication unit configured to transceive communication data;
   a touchscreen configured to receive a touch input or a touch and drag input on a predetermined touch area including a touch icon for transmitting the communication data to at least one other terminal; and
   a controller configured to:
   select the first identity module to be used to transmit the communication data when the touch and drag input is performed on the touch icon to a first direction,
   select the second identity module to be used to transmit the communication data when the touch and drag input is performed on the touch icon to a second direction, and
   prompt a user to change a currently selected identity module to another identity module when the selected identity module is in a poor communication state.

2. The mobile terminal of claim 1, wherein the communication data comprises at least one of an audio call, a video call, a text message, an email and a multimedia message.

3. The mobile terminal of claim 1, wherein the controller is further configured to display indication information on the predetermined touch area indicating which of the first and second identity modules is selected.

4. The mobile terminal of claim 1, wherein the controller is further configured to display state information indicating a current communication state of the first and/or second identity modules.

5. The mobile terminal of claim 1, wherein the controller is further configured to display, on the touchscreen, call information concerning first and second calls performed simultaneously using the first and second identity modules, respectively, and to display a predetermined soft key that can be touched in a predefined manner to cancel the call to either one of the first or second calls.

6. The mobile terminal of claim 1, wherein the controller is further configured to display, on the touchscreen, a communication log including a plurality of counterparts, and
   wherein each of the counterparts includes an individual send key zone for transmitting the communication data, and information about which of the first and second identity modules was used for the respective communications.

7. The mobile terminal of claim 6, wherein the controller is further configured to:
   transmit the communication data using the identity modules used for the respective communications when receiving a touch input on the individual send key zone, and
   transmit the communication data using the identity modules not used for the respective communications when receiving a touch and drag input on the individual send key zone.

8. A method of controlling a mobile terminal including at least a first identity module and a second identity module, the method comprising:
   allowing, via a wireless communication unit, transceiving of communication data using one of the first and second identity modules;
   receiving, via a touchscreen, a touch input or a touch and drag input on a touch icon of the touchscreen for transmitting the communication data to at least one other terminal; and
   controlling, via a controller, the wireless communication unit to transmit the communication data using the first identity module when the touch and drag input is performed on the touch icon to a first direction;
   controlling, via the controller, the wireless communication unit to transmit the communication data using the second identity module when the touch and drag input is performed on the touch icon to a second direction; and
   prompting a user to change a currently selected identity module to another identity module when the selected identity module is in a poor communication state.

9. The method of claim 8,
   wherein the communication data comprises at least one of an audio call, a video call, a text message, an email and a multimedia message.

10. The method of claim 8, further comprising:
    displaying indication information on the touch icon indicating which of the first and second identity modules is selected.

11. The method of claim 8, further comprising:
    displaying state information indicating a current communication state of the first and/or second identity modules.

12. The method of claim 8, further comprising:
    displaying, on the touchscreen, call information concerning first and second calls performed simultaneously using the first and second identity modules, respectively, and displaying a predetermined soft key that can be touched in a predefined manner to cancel the call to either one of the first or second calls.

13. The method of claim 8, further comprising:
    displaying, on the touchscreen, a communication log including a plurality of counterparts,
    wherein each of the counterparts include an individual send key zone for transmitting the communication data, and information about which of the first and second identity modules was used for the respective communications.

14. The method of claim 13, further comprising:
    transmitting the communication data using the identity modules used for the respective communications when receiving a touch input on the individual send key zone; and transmitting the communication data using the identity modules not used for the respective communication when receiving a touch and drag input on the individual send key zone.

\* \* \* \* \*